(12) United States Patent
Yanagisawa et al.

(10) Patent No.: US 11,231,298 B2
(45) Date of Patent: Jan. 25, 2022

(54) SENSOR, SENSOR SUBSTRATE, AND SENSOR MANUFACTURING METHOD

(71) Applicant: NSK LTD., Tokyo (JP)

(72) Inventors: Tomoyuki Yanagisawa, Fujisawa (JP); Minoru Kubokawa, Fujisawa (JP); Toshiaki Oguchi, Fujisawa (JP); Hideki Furukawa, Fujisawa (JP); Yasuhiro Kawai, Fujisawa (JP)

(73) Assignee: NSK LTD., Tokyo (JP)

( * ) Notice: Subject to any disclaimer, the term of this patent is extended or adjusted under 35 U.S.C. 154(b) by 691 days.

(21) Appl. No.: 16/079,621

(22) PCT Filed: Feb. 25, 2016

(86) PCT No.: PCT/JP2016/055721
§ 371 (c)(1),
(2) Date: Aug. 24, 2018

(87) PCT Pub. No.: WO2017/145344
PCT Pub. Date: Aug. 31, 2017

(65) Prior Publication Data
US 2021/0180996 A1 Jun. 17, 2021

(51) Int. Cl.
*G01D 5/347* (2006.01)

(52) U.S. Cl.
CPC ................. *G01D 5/3473* (2013.01)

(58) Field of Classification Search
CPC .................................................. G01D 5/3473
See application file for complete search history.

(56) References Cited

U.S. PATENT DOCUMENTS

| 6,486,802 B2 | 11/2002 | Watanabe |
| 2009/0090851 A1* | 4/2009 | Wong ........................ G01D 5/32 250/231.13 |

(Continued)

FOREIGN PATENT DOCUMENTS

| CN | 102467301 A | 5/2012 |
| CN | 203365699 U | 12/2013 |

(Continued)

OTHER PUBLICATIONS

Communication dated Jun. 17, 2020, issued by the State Intellectual Property Office of the P.R.C. in application No. 201680084934.5.

(Continued)

*Primary Examiner* — Thanh Luu
*Assistant Examiner* — Monica T Taba
(74) *Attorney, Agent, or Firm* — Sughrue Mion, PLLC

(57) ABSTRACT

A sensor includes a generator configured to generate a predetermined detection target, a detector configured to detect the detection target generated by the generator, and a substrate provided with the generator and the detector. The substrate includes a first portion provided with the generator, a second portion provided with the detector, a bent portion that is bent between the first portion and the second portion such that the generator and the detector face each other, and a ground pattern provided in a portion including the first portion, the second portion, and the bent portion. In the ground pattern, a ground pattern of the bent portion is narrower than a ground pattern of the first portion and a ground pattern of the second portion.

6 Claims, 16 Drawing Sheets

(56) References Cited

U.S. PATENT DOCUMENTS

| | | | |
|---|---|---|---|
| 2009/0309436 A1* | 12/2009 | Saito | H02K 7/063 |
| | | | 310/81 |
| 2014/0179127 A1* | 6/2014 | Denis | H05K 1/0237 |
| | | | 439/43 |
| 2017/0219388 A1 | 8/2017 | Kawai et al. | |
| 2017/0219389 A1 | 8/2017 | Kawai et al. | |
| 2017/0254678 A1 | 9/2017 | Kawai et al. | |

FOREIGN PATENT DOCUMENTS

| | | |
|---|---|---|
| JP | 58-39088 A | 3/1983 |
| JP | 6-86363 U | 12/1994 |
| JP | 8-327402 A | 12/1996 |
| JP | 2001-027551 A | 1/2001 |
| JP | 2001-141433 A | 5/2001 |
| JP | 2001-296147 A | 10/2001 |
| JP | 2005-091092 A | 4/2005 |
| JP | 2013-2832 A | 1/2013 |
| JP | 2016-17884 A | 2/2016 |
| WO | 2016/021635 A1 | 2/2016 |
| WO | 2016/021657 A1 | 2/2016 |
| WO | 2016/021667 A1 | 2/2016 |

OTHER PUBLICATIONS

Notification of Reasons for Refusal for Japanese Patent Application No. 2014-252132 dated Jul. 17, 2018.
International Search Report for PCT/JP2016/055721 dated May 24, 2016 [PCT/ISA/210].

* cited by examiner

SENSOR, SENSOR SUBSTRATE, AND SENSOR MANUFACTURING METHOD

CROSS-REFERENCE TO RELATED APPLICATION

This application is a National Stage of PCT international application Ser. No. PCT/JP2016/055721 filed on Feb. 25, 2016 which designates the United States, incorporated herein by reference.

FIELD

The present invention relates to a sensor, a sensor substrate, and a sensor manufacturing method.

BACKGROUND

A configuration of accommodating a substrate provided with a light emitting element emitting light, and a substrate provided with a light receiving element detecting the light emitted from the light emitting element, in a housing of a rotary encoder, has been known as a configuration of a rotary encoder (for example, Patent Literature 1).

CITATION LIST

Patent Literature

Patent Literature 1: JP 2001-027551 A

Technical Problem

However, in the rotary encoder described in Patent Literature 1, the light emitting element and the light receiving element are provided in separate substrates; and thus, in the assembly, it is necessary to perform positioning for determining a relationship between an irradiation region of the light from the light emitting element and a light receiving region of the light receiving element. When a positional deviation occurs due to mispositioning, the output of the light receiving element does not become an intended output in some cases, thus causing the output associated with sensing to be unstable. In particular, when the rotary encoder includes a plurality of light receiving elements, a positional deviation causes variations in the outputs of the light receiving elements, thus causing the outputs associated with sensing to be unstable.

Such problems associated with the rotary encoder of Patent Literature 1 are not limited to the rotary encoder of light detection, but are common in sensors including a generator generating a detection target (for example, light or the like) and a detector detecting the detection target generated by the generator that are provided in separate substrates.

An object of an aspect of the present invention is to provide a sensor in which positioning between a generator and a detector is more easily performed, and a manufacturing method of the sensor. Further, an object of an aspect of the present invention is to provide a sensor that is more easily manufactured, a substrate of the sensor, and a manufacturing method of the sensor.

SUMMARY

A sensor according to an aspect of the present invention for attaining the objects described above includes: a generator configured to generate a predetermined detection target; a detector configured to detect the detection target generated by the generator; and a substrate provided with the generator and the detector. The substrate includes a first portion provided with the generator, a second portion provided with the detector, a bent portion that is bent between the first portion and the second portion such that the generator and the detector face each other, and a ground pattern provided in a portion including the first portion, the second portion, and the bent portion. In the ground pattern, a ground pattern of the bent portion is narrower than a ground pattern of the first portion and a ground pattern of the second portion.

A sensor substrate according to an aspect of the present invention for attaining the objects described above, is a substrate of a sensor including a generator configured to generate a predetermined detection target, a detector configured to detect the detection target generated by the generator, and the substrate provided with the generator and the detector, the substrate including: a first portion provided with the generator; a second portion provided with the detector; a bent portion that is bent between the first portion and the second portion such that the generator and the detector face each other; and a ground pattern provided in a portion including the first portion, the second portion, and the bent portion. In the ground pattern, a ground pattern of the bent portion is narrower than a ground pattern of the first portion and a ground pattern of the second portion.

A sensor manufacturing method according to an aspect of the present invention for attaining the objects described above, is a manufacturing method of a sensor including a generator configured to generate a predetermined detection target, a detector configured to detect the detection target generated by the generator, and a substrate provided with the generator and the detector, the method including: a step of preparing the substrate including a first portion provided with the generator, a second portion provided with the detector, a bent portion to be bent between the first portion and the second portion such that the generator and the detector face each other, and a ground pattern provided in a portion including the first portion, the second portion, and the bent portion; and a step of bending the substrate in the bent portion. In the ground pattern, a ground pattern of the bent portion is narrower than a ground pattern of the first portion and a ground pattern of the second portion.

Accordingly, the first portion provided with the generator and the second portion provided with the detector are not separated from each other, thereby positioning the generator and the detector by a simple operation of bending or curving the substrate. Thus, according to the sensor of the aspect of the present invention, the positioning between the generator and the detector is more easily performed. Further, in the ground pattern, the ground pattern of the bent portion is narrower than the ground pattern of the first portion and the ground pattern of the second portion, thereby bending the bent portion more easily than other portions, with respect to a condition such as the elasticity and the rigidity of the substrate. Consequently, the sensor can be more easily manufactured.

In the sensor of the aspect of the present invention, the substrate includes a connection portion connecting the first portion and the second portion together, and the bent portion is provided between the connection portion and the first portion, and between the connection portion and the second portion.

Accordingly, the connection portion provides a region between the first portion and the second portion. Thus, a region between the generator and the detector is more easily provided.

In the sensor of the aspect of the present invention, the ground pattern is further provided in a portion including the connection portion, and, in the ground pattern, the ground pattern of the bent portion is narrower than a ground pattern of the connection portion.

Accordingly, the bent portion can be bent more easily than other portions, with respect to the condition such as the elasticity and the rigidity of the substrate. Thus, the sensor is manufactured more easily.

In the sensor of the aspect of the present invention, the substrate is a flexible printed circuit.

Accordingly, it is possible to more easily perform a series of operations of mounting components including the generator and the detector on the substrate, in a state where the first portion and the second portion exist in the same plane, and then, of processing the substrate in order to provide a detection region between the generator and the detector.

In the sensor of the aspect of the present invention, the sensor is a rotary encoder.

Therefore, according to an aspect of the present invention, it is possible to detect an angle position such as a turning angle of a turning motion body connected to the rotary encoder.

Advantageous Effects of Invention

According to the sensor, the sensor substrate, and the sensor manufacturing method, of an aspect of the present invention, the positioning between the generator and the detector is performed more easily. Further, according to the sensor, the sensor substrate, and the sensor manufacturing method, of an aspect of the present invention, the sensor is more easily manufactured.

DESCRIPTION OF EMBODIMENTS

A mode (an embodiment) for carrying out the present invention will be described in detail with reference to the drawings. The present invention is not limited to the contents described in the following embodiment. Constituents in the following description include those easily conceivable by a person skilled in the art and those substantially identical thereto. Further, the constituents in the following description can be combined as appropriate.

Figure 1:
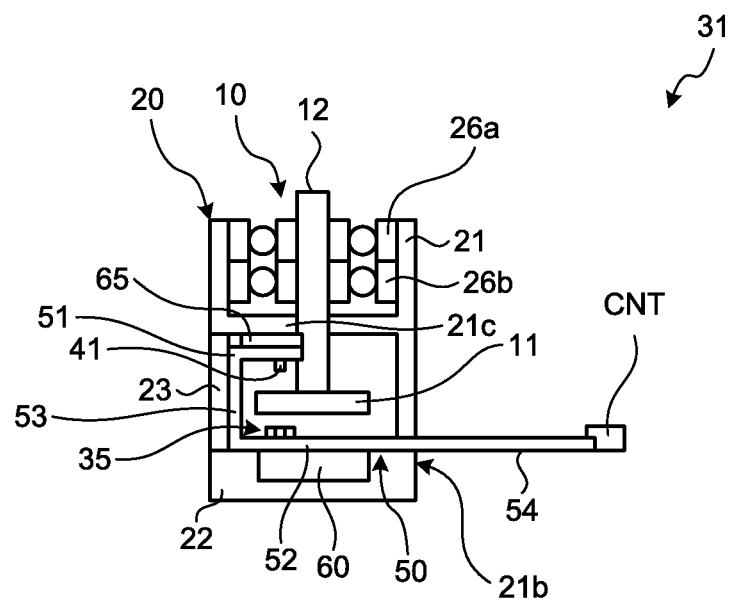
FIG. 1 is a configuration diagram of a sensor according to one embodiment of the present invention.
Figure 2:
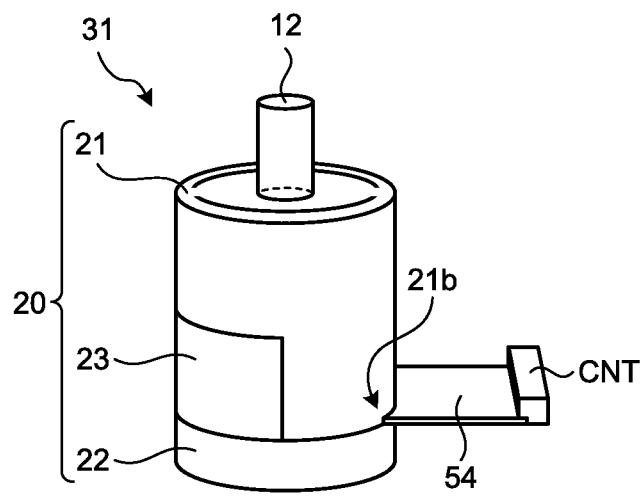
FIG. 2 is an external perspective view of the sensor.
Figure 3:
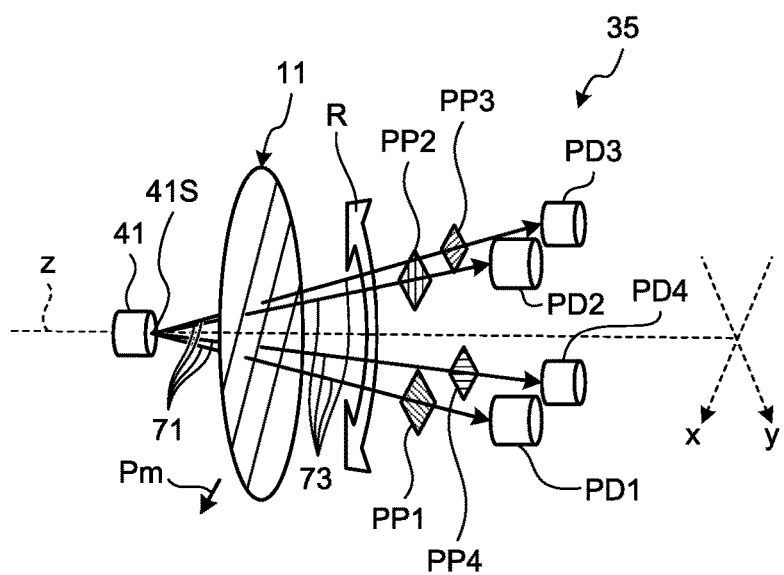
FIG. 3 is an explanatory diagram illustrating an example of an arrangement of a generator, an optical scale, and a detector.
Figure 4:
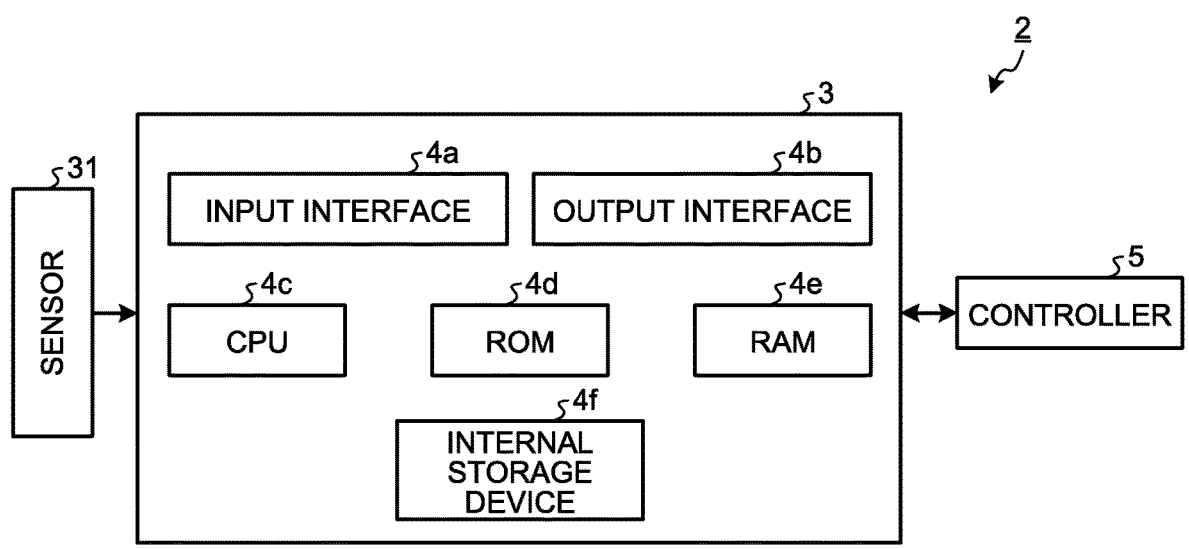
FIG. 4 is a block diagram of an optical encoder.
Figure 5:
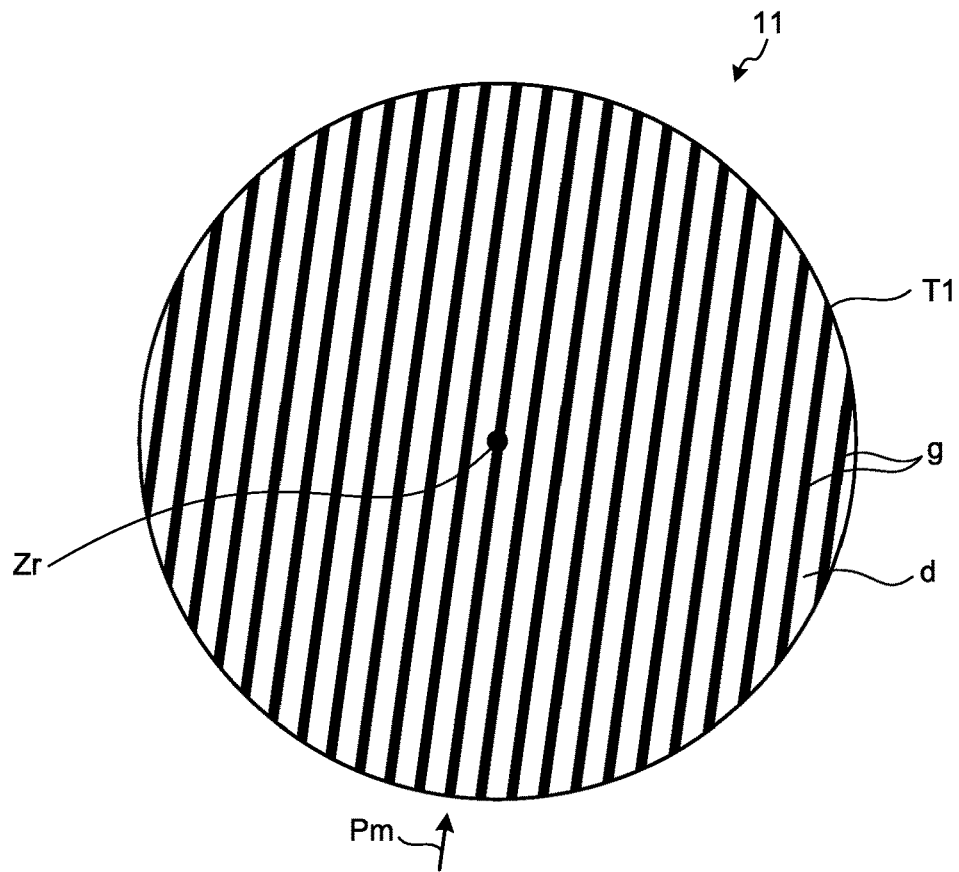
FIG. 5 is an explanatory diagram illustrating an example of a pattern of the optical scale.

FIG. 1 is a configuration diagram of a sensor 31 according to one embodiment of the present invention. FIG. 2 is an external perspective view of the sensor 31. FIG. 1 is a schematic diagram illustrating a sectional configuration of FIG. 2. FIG. 3 is an explanatory diagram illustrating an example of an arrangement of a generator 41, an optical scale 11, and a detector 35. FIG. 4 is a block diagram of an optical encoder 2. FIG. 5 is an explanatory diagram illustrating an example of a pattern of the optical scale 11. The sensor 31 includes the generator 41 generating a detection target that is an electromagnetic wave (for example, light), the detector 35 detecting the detection target generated by the generator 41 provided with a detection region therebetween, and a substrate 50 provided with the generator 41 and the detector 35. In this embodiment, the sensor 31 further includes a rotor 10 and a stator 20. The rotor 10 includes a shaft 12 and a motion body (the optical scale 11). The shaft 12 is connected to a rotary machine such as a motor. The motion body (the optical scale 11) is attached to an end portion of the shaft 12 and provided to be rotatable in the detection region. Furthermore, the detection region is a space between the generator 41 and the detector 35. The generator 41 in this embodiment includes a light emitting element that emits light. The detector 35 in this embodiment is a light receiving element that receives the light emitted from the generator 41 serving as the light emitting element. More specifically, the detector 35 of this embodiment includes four light receiving elements of a first light receiver PD1 including a polarization layer PP1, a second light receiver PD2 including a polarization layer PP2, a third light receiver PD3 including a polarization layer PP3, and a fourth light receiver PD4 including a polarization layer PP4. In order to describe that incident light 73, which travels toward the light receivers (the first light receiver PD1 to the fourth light receiver PD4) from source light 71 generated by the generator 41, passes through the respective polarization layers PP1 to PP4, the polarization layers PP1 to PP4 are illustrated apart from the first light receiver PD1 to the fourth light receiver PD4 in FIG. 3. The respective polarization layers and the light receivers, however, actually abut on each other.

Figure 6:
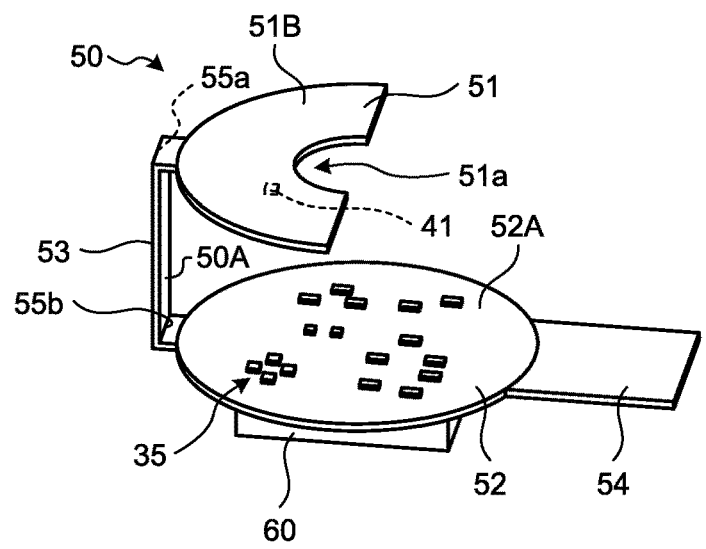
FIG. 6 is a perspective view illustrating an example of a substrate.
Figure 7:
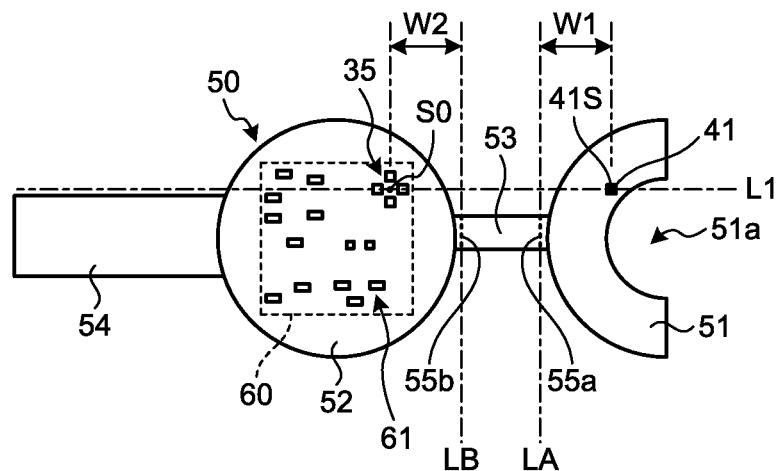
FIG. 7 is a plan view illustrating an example of the substrate before being bent.
Figure 8:
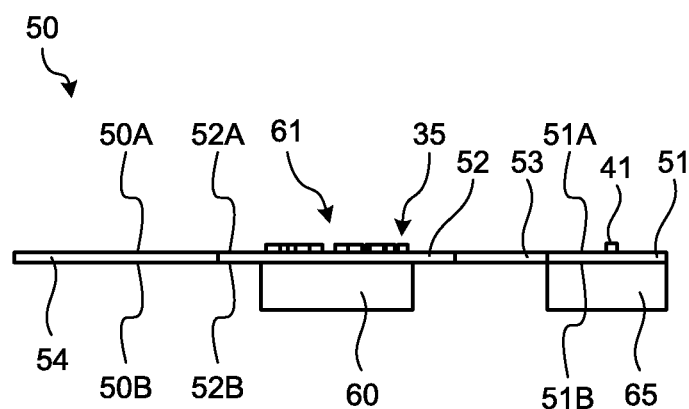
FIG. 8 is a diagram illustrating an example of a correspondence relationship between a circuit arrangement on a surface where the generator and the detector are provided, and a configuration provided on a rear surface.
Figure 9:
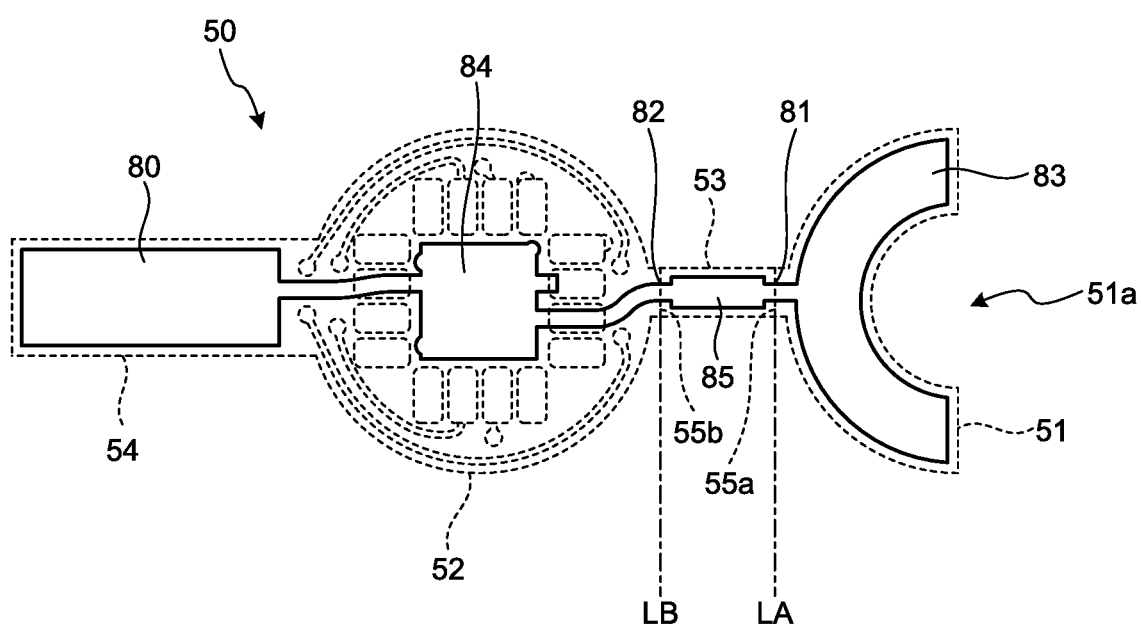
FIG. 9 is a diagram illustrating an example of a ground pattern of the substrate.
Figure 10:
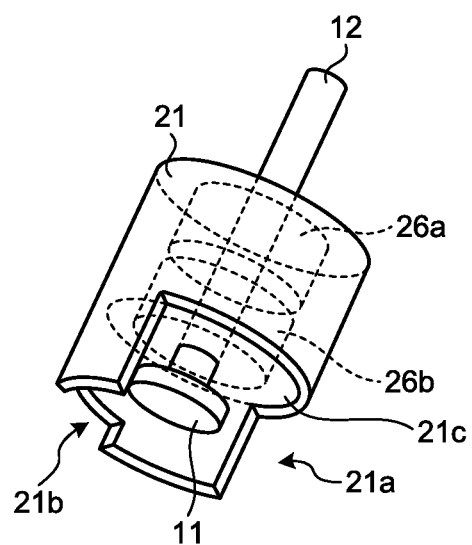
FIG. 10 is a perspective view illustrating an example of a body of a stator, and a configuration provided on the body.
Figure 11:
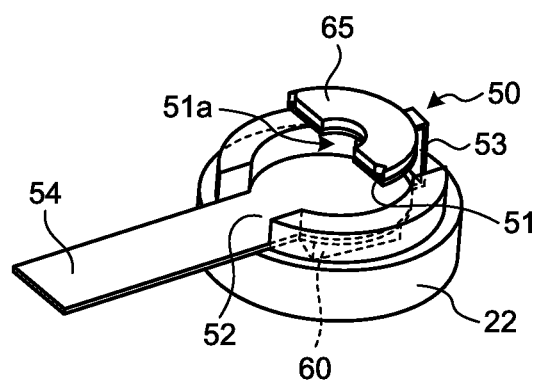
FIG. 11 is a perspective view illustrating an example of a configuration provided on a chassis of the stator.
Figure 12:
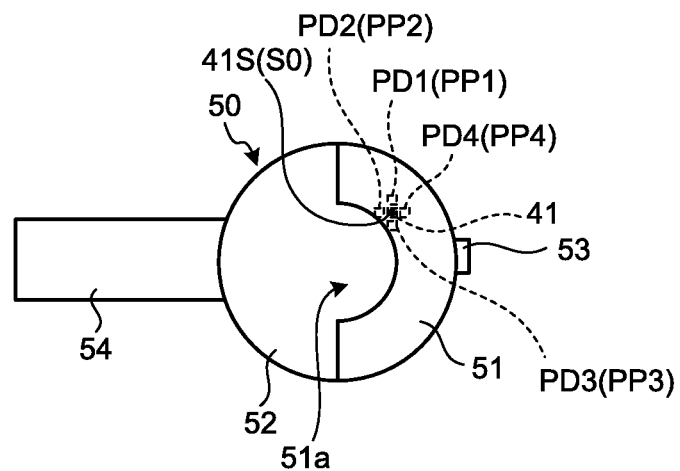
FIG. 12 is a diagram illustrating an example of a position relationship between the generator and the detector.
Figure 13:
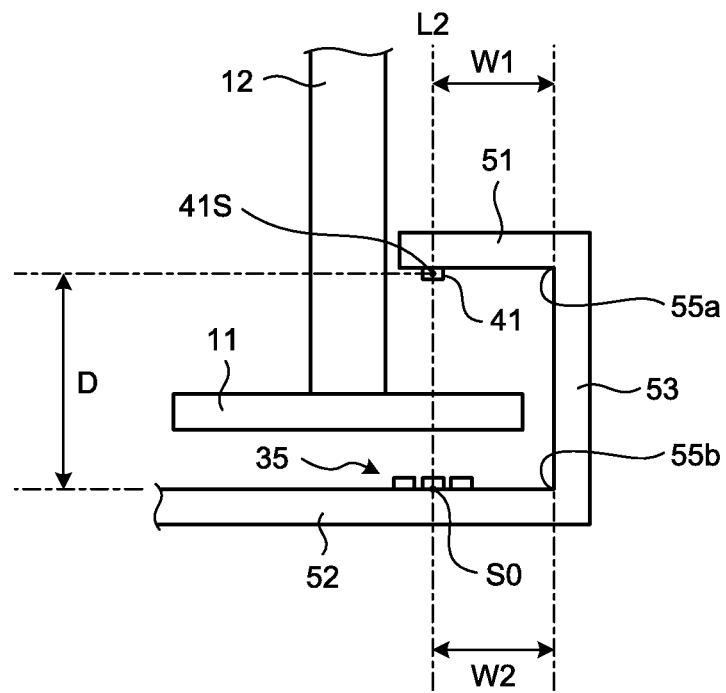
FIG. 13 is a diagram illustrating an example of the position relationship between the generator and the detector.
Figure 14:
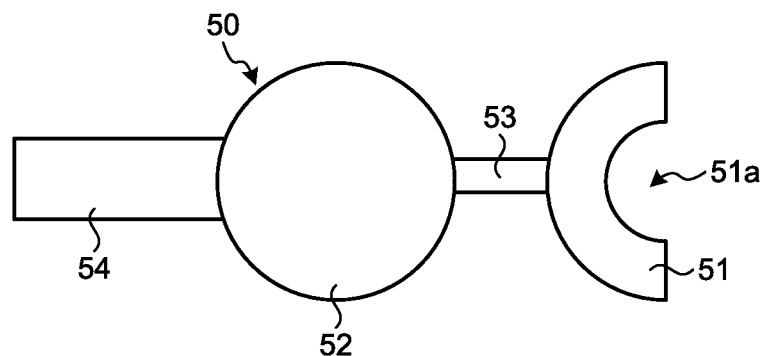
FIG. 14 is a plan view illustrating an example of the substrate before a circuit is mounted thereon.
Figure 15:
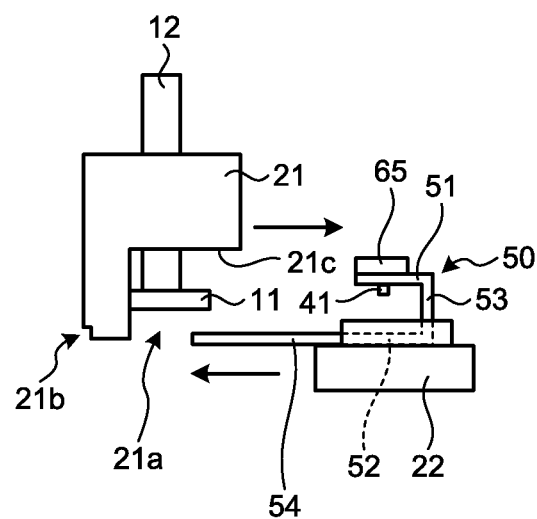
FIG. 15 is a diagram illustrating an example of the assembly of the stator for providing the optical scale in a detection region.
Figure 16:
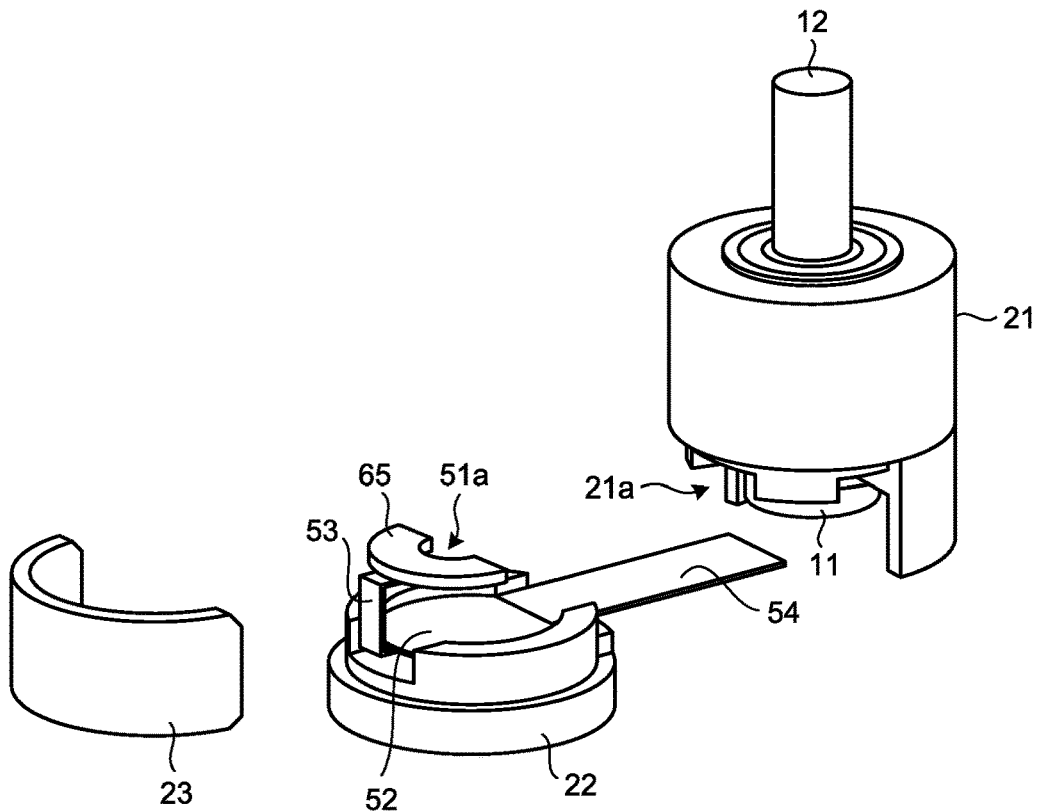
FIG. 16 is a diagram illustrating an example of the assembly of the stator for providing the optical scale in the detected region.
Figure 17:
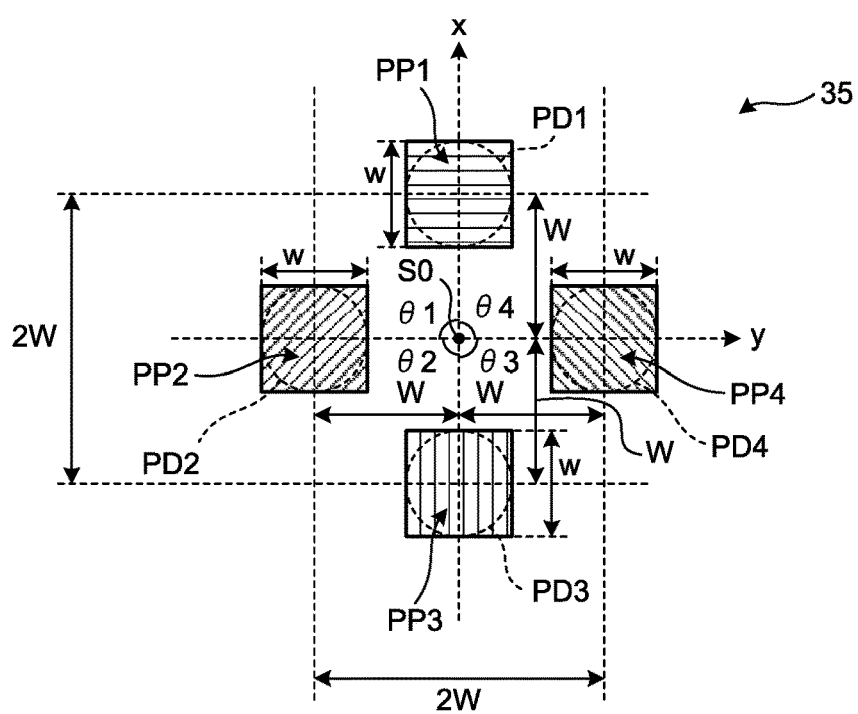
FIG. 17 is an explanatory diagram for illustrating an example of the detector.

FIG. 6 is a perspective view illustrating an example of the substrate 50. FIG. 7 is a plan view illustrating an example of the substrate 50 before being bent. FIG. 8 is a diagram illustrating an example of a correspondence relationship between a circuit arrangement on a surface where the generator 41 and the detector 35 are provided, and a configuration provided on a rear surface. FIG. 9 is a diagram illustrating an example of a ground pattern of the substrate 50. FIG. 10 is a perspective view illustrating an example a body 21 of the stator 20, and a configuration provided on the body 21. FIG. 11 is a perspective view illustrating an example of a configuration provided on a chassis 22 of the stator 20. FIG. 12 and FIG. 13 are diagrams illustrating an example of a position relationship between the generator 41 and the detector 35. FIG. 14 is a plan view illustrating an example of the substrate before a circuit is mounted thereon. FIG. 15 and FIG. 16 are diagrams illustrating an example of the assembly of the stator 20 for providing the optical scale 11 in the detection region. FIG. 17 is an explanatory diagram for illustrating an example of the detector 35. The substrate 50 is configured such that a first portion 51 provided with the generator 41 and a second portion 52 provided with the detector 35 are integrated with each other. For example, as illustrated in FIG. 6 and FIG. 7, the substrate 50 is one substrate including the semicircular arc-like first portion 51 and the circular second portion 52. The substrate 50 is, for example, a flexible printed circuit (FPC). Various circuits (for example, an IC circuit 60 illustrated in FIG. 6, or the like) including the generator 41 and the detector 35 are mounted on the substrate 50. More specifically, the FPC is, for example, a wiring substrate having flexibility obtained by using an insulating body such as a polyimide film or a photo-solder resist film, as a base film, by forming an adhesive layer and a conductor layer on the base film, and by covering, with the insulating body, a portion of the conductor layer except for a terminal portion (including a soldering portion). The conductor layer is an electrical conductor such as copper. Patterns on the conductor layer form a signal line, a power line, a ground pattern 80, and the like, to be connected to components such as various circuits. A specific configuration of a flexible substrate that can be used in the embodiment of the present invention is not limited thereto, and can be changed as appropriate. Various circuits such as the IC circuit 60, except for the detector 35 and the generator 41, configure a pre-amplifier AMP, a differential operational circuit DS, a filter circuit NR, a multiplication circuit AP, and the like, illustrated in FIG. 23 described below. Hereinafter, a surface of the substrate 50 on a side where the generator 41 and the detector 35 are provided, may be referred to as a front surface 50A, and a surface on the opposite side may be referred to as a rear surface 50B (refer to FIG. 8). In the front surface 50A of the substrate 50, a front surface 51A of the first portion 51 and a front surface 52A of the second portion may be distinctively described. In the rear surface 50B of the substrate 50, a rear surface 51B of the first portion 51 and a rear surface 52B of the second portion 52 may be distinctively described.

A plate-like support member is provided in the substrate 50. The support member keeps a surface, on which an electronic component is provided, flat. The support member is attached to a surface on a rear side of at least one of a surface of the first portion 51 on which an electronic component including the generator 41 is provided and a surface of the second portion 52 on which an electronic component including the detector 35 is provided. Specifically, as illustrated in, for example, FIG. 7, a component 61 is provided on the same surface (the front surface 52A) in the second portion 52 as that on which the light receiving elements are provided. In addition to photodiodes (the first light receiver PD1 to the fourth light receiver PD4) constituting the light receiving elements, the component 61 is provided inside a mounting region of the IC circuit 60 on the rear surface 52B on the opposite side of the front surface 52A. The component 61 is a component other than the light receiving elements and provided on the same surface (the front surface 52A) in the second portion 52 as that on which the light receiving elements are provided, and specifically, includes a circuit component such as an IC chip, a resistor, and a capacitor. The IC circuit 60 is, for example, an integrated circuit to which a quad flat no lead package (QFN) is adopted. Thus, a support member of the second portion 52 in this embodiment is a package of an integrated circuit (the IC circuit 60). One or more electronic components (for example, the detector 35 and the component 61) to be provided in the second portion 52 to which the package is attached, are provided on a rear side of the substrate 50 opposite to the side thereof on which the package is provided, and arranged in a position corresponding to a position where the package is arranged. The package of the integrated circuit is not limited to the QFN package, and it may be any package that provides a configuration including a support structure portion capable of functioning as a support member for keeping a surface on a side opposite to a surface on which the integrated circuit is provided (for example, the front surface 52A of the second portion 52) flat. Furthermore, in this embodiment, the component 61 such as an IC chip, a resistor, and a capacitor, which is the other circuit to be provided on the front surface 52A of the second portion 52, includes a package circuit that is connected to wiring by soldering, and a bare chip that is connected to wiring by a method such as wire bonding. However, such a configuration is merely an example, and the component 61 is not limited to the configuration. The component 61 may be either one of the package circuit or the bare chip, or may be a circuit of which a part or all parts are provided using other packaging technologies.

As illustrated in FIG. 8, in the first portion 51 of this embodiment, a support substrate 65 is provided on a rear side of a surface on which the light emitting element packaged with a light emitting device 41U (refer to FIG. 26) is provided. The support substrate 65 is, for example, a semicircular arc-like plate member corresponding to the semicircular arc-like first portion 51. More specifically, the first portion 51 and the support substrate 65 include a semicircular arc-like plate surface corresponding to one of two semicircular arc-like plate surfaces obtained by dividing a donut-like (circular arc-like) plate surface, in which a circular hole is provided at the center of a surface of a circular plate, into two along the diameter, the circular hole having a diameter smaller than that of the circular plate. The support substrate 65 is formed of, for example, a resin having insulating properties. Thus, a support member of the first portion 51 in this embodiment is a plate-like member having insulating properties, which is formed corresponding to the shape of the first portion 51. The support substrate 65 in this embodiment is merely an example of the support member other than a circuit and not limited thereto. The support member can be changed as appropriate.

The substrate 50 includes a connection portion 53 connecting the first portion 51 and the second portion 52 together. Specifically, for example, as illustrated in FIG. 6 and FIG. 7, the connection portion 53 is provided between the first portion 51 and the second portion 52 such that a circular arc-like outer circumferential portion of the first portion 51 and a circular arc-like outer circumferential portion of the second portion 52 are connected together.

The connection portion 53 includes wiring that is connected to the generator 41 (or the detector 35). In this embodiment, the connection portion 53 includes a signal line and a power line that are connected to the generator 41. Specifically, the wiring of the connection portion 53 is provided as a signal line and a power line mounted on the FPC, for example. Furthermore, a circuit is not provided in the connection portion 53 of this embodiment, but a component such as a circuit can be provided in the connection portion 53.

As illustrated in FIG. 6 and FIG. 7, the connection portion 53 of this embodiment has a smaller width in a direction along the plate surface of the substrate 50 and orthogonal to an extending direction of the connection portion 53 between the first portion 51 and the second portion 52, than the first portion 51 and the second portion 52.

The substrate 50 includes a harness portion 54 including wiring that is connected to the generator 41 and the detector 35. Specifically, for example, as illustrated in FIG. 6 and FIG. 7, the harness portion 54 is provided to extend from the first portion 51 to a side opposite to the connection portion 53. The harness portion 54 includes a signal line and a power line that are connected to the generator 41, the detector 35, and various circuits provided on the substrate 50. Specifically, the wiring of the harness portion 54 is provided as a signal line and a power line mounted on the FPC, for example. In this embodiment, the wiring of the generator 41 is provided in the first portion 51, the connection portion 53, and the harness portion 54. The wiring of the detector 35 is provided in the second portion 52 and the harness portion 54.

The harness portion 54 may be connected to a connector CNT, as illustrated in, for example, FIG. 1. The connector CNT is an interface connecting the sensor 31 and other devices (for example, an arithmetic device 3) together. The sensor 31 is connected to the arithmetic device 3 through the connector CNT. That is, the harness portion 54 functions as wiring connecting various circuits provided on the substrate 50 and other devices (for example, the arithmetic device 3) together. Furthermore, the harness portion 54 may be provided with a component such as a circuit. The connector CNT can be omitted. In this case, a tip end of the harness portion 54 is provided as, for example, a terminal that is inserted into a connector (not illustrated) provided on a device to which the sensor 31 is connected.

The substrate 50 is provided such that the first portion 51 and the second portion 52 are parallel to each other. Specifically, the substrate 50 is bent such that the substrate 50 is bent into a shape (a U-shape) where the generator 41 and the detector 35 face each other, as illustrated in FIG. 1 and FIG. 6. In this embodiment, the substrate 50 is bent at a right angle at each of a bent portion 55a between the connection portion 53 and the first portion 51 and a bent portion 55b between the connection portion 53 and the second portion 52 such that the front surface 50A is inside. That is, the substrate 50 is bent such that the first portion 51 and the second portion 52 are each at a right angle with respect to the connection portion 53, and the first portion 51 and the second portion 52 face each other. Accordingly, the first portion 51 and the second portion 52 are provided parallel to each other, and the generator 41 and the detector 35 face each other. Thus, the substrate 50 includes the bent portions 55a and 55b that are bent between the first portion 51 and the second portion 52 such that the generator 41 and the detector 35 face each other. In this embodiment, the bent portions 55a and 55b are respectively provided between the connection portion 53 and the first portion 51, and between the connection portion 53 and the second portion 52.

A surface on a side where the generator 41 is provided in the first portion 51, and a surface on a side where the detector 35 is provided in the second portion 52, are the same surface (the front surface 50A) in the substrate 50. The surface on a side where the generator 41 is provided and the surface on a side where the detector 35 is provided, are provided to face each other. Thus, as illustrated in FIG. 3 and other figures, a position relationship between the generator 41 and the detector 35 is a position relationship allowing the detection target (for example, light) generated by the generator 41 to be detected by the detector 35. The space between the generator 41 and the detector 35 facing each other is the detection region.

Thus, in the substrate 50, the first portion 51 provided with the generator 41, the second portion 52 provided with the detector 35, and the connection portion 53 connecting the first portion 51 and the second portion 52 together are integrated with each other. Further, the substrate 50 is bent at a right angle at each of the two bent portions 55a and 55b, so that the surface of the first portion 51 on which the generator 41 is provided (the front surface 51A) and the surface of the second portion 52 on which the detector 35 is provided (the front surface 52A) are provided parallel to and facing each other. Here, as illustrated in FIG. 7, a first axis LA serving as a bending axis of the bent portion 55a is parallel to a second axis LB serving as a bending axis of the bent portion 55b. The bending axis indicates an axis serving as, when the substrate 50 is bent, a motion center axis of a bending motion of one portion (for example, the connection portion 53) with respect to another portion (for example, the first portion 51 or the second portion 52) that face the one portion with a bending portion (for example, the bent portions 55a and 55b) of the substrate 50 therebetween. The first axis LA and the second axis LB in this embodiment are respectively located in positions overlapping two bending lines formed as bending places in the bent portions 55a and 55b on the substrate 50.

The substrate 50 includes the ground pattern provided in a portion including the first portion 51, the second portion 52, and the bent portions 55a and 55b. In the ground pattern 80, a ground pattern 81 of the bent portions 55a and a ground pattern 82 of the bent portion 55b are narrower than a ground pattern 83 of the first portion 51 and a ground pattern 84 of the second portion 52. In this embodiment, the ground pattern 80 is further provided in a portion including the connection portion 53. In the ground pattern 80, the ground pattern 81 of the bent portion 55a and the ground pattern 82 of the bent portion 55b are narrower than a ground pattern 85 of the connection portion 53. Specifically, the substrate 50 includes a rolled copper foil or the like, as the ground pattern 80. The ground pattern 80 is electrically connected to various electronic components provided on the substrate 50 such as the generator 41, the detector 35, and the IC circuit 60. The potential of the ground pattern 80 functions as a reference of the potential of the electronic components. The ground pattern 80 is covered except for the terminal portion (including the soldering portion) connected to the electronic circuits. For example, as illustrated in FIG. 9, the maximum widths of the ground patterns 81 and 82 of the bent portions 55a and 55b included in the ground pattern 80, in a direction along the bending axes LA and LB, are narrower than the maximum widths of the ground pattern 83 of the first portion 51, the ground pattern 84 of the second portion 52, and the ground pattern 85 of the connection portion 53.

The ground pattern 80 of this embodiment has a uniform thickness. That is, the thicknesses of the ground patterns 81 to 85 of the bent portions 55a and 55b, the first portion 51, the second portion 52, and the connection portion 53 are equal to each other. The ground pattern 80 of this embodiment has a single plate structure in which the first portion 51 to the harness portion 54 are arranged continuously without any interruption. Such specific configuration relevant to the thickness and the structure of the ground pattern 80 is merely an example. The configuration is not limited thereto and can be changed as appropriate. For example, in a case where the thickness of the ground pattern 80 is not made to be uniform, the ground patterns 81 and 82 of the bent portions 55a and 55b can be formed to be thinner than the ground pattern of the other portion, and thus, the bending in the bent portions 55a and 55b is performed more easily.

On the plane before the substrate 50 is bent, a distance between a first point and the first axis LA is equal to a distance between a second point and the second axis LB. The first point is a generation center point of the detection target of the generator 41, and the second point is either one of the center of a detection region of the detection target of the detector 35 or an arrangement center of a plurality of detection regions of the detector 35. Specifically, as illustrated in FIG. 7, a distance W1 is equal to a distance W2. In this embodiment, the distance W1 is a distance between an emitting point 41S of the light generated by the generator 41 and the first axis LA serving as the bending line in the bent portion 55a, and the distance W2 is a distance between an arrangement center S0 of the four light receiving elements of the detector 35, that is, the first light receiver PD1, the second light receiver PD2, the third light receiver PD3, and the fourth light receiver PD4, and the second axis LB serving as the bending line in the bent portion 55b. Here, the emitting point 41S of the light generated by the generator 41 is the first point in this embodiment, and the arrangement center S0 is the second point in this embodiment.

The first point and the second point are located on the same straight line along the substrate 50 before being bent, and the straight line intersects each of the first axis LA and the second axis LB at a right angle. The first point and the second point are located on the same straight line orthogonal to the first axis LA and the second axis LB. Specifically, as illustrated in FIG. 7, the emitting point 41S of the light generated by the generator 41 and the arrangement center S0 are located on a straight line L1 that is the same straight line orthogonal to two bending lines in the bent portions 55a and 55b, that is, the first axis LA and the second axis LB.

The four light receiving elements are arranged in different positions on a predetermined plane. The four light receiving elements are arranged at equal distances from one point on the predetermined plane. Four line segments connecting one point and the respective centers of light receiving regions of the four light receiving elements form right angles with each other. Specifically, the first light receiver PD1, the second light receiver PD2, the third light receiver PD3, and the fourth light receiver PD4, which are the four light receiving elements of the detector 35, are arranged at the same distance from one point (the arrangement center S0) on the front surface 52A of the second portion 52 of the substrate 50. On the front surface 52A, the first light receiver PD1 and the third light receiver PD3 are arranged in a point-symmetric position with respect to the arrangement center S0, and the second light receiver PD2 and the fourth light receiver PD4 are arranged in a point-symmetric position with respect to the arrangement center S0. In this embodiment, the light receiving regions of the first light receiver PD1, the second light receiver PD2, the third light receiver PD3, and the fourth light receiver PD4 are the same in shape and area. The detector 35 is arranged such that the center of the light receiving region of the first light receiver PD1 and the center of the light receiving region of the third light receiver PD3 are arranged at distance of 2 W with the arrangement center S0 as a center therebetween, and the center of the light receiving region of the second light receiver PD2 and the center of the light receiving region of the fourth light receiver PD4 are arranged at distance of 2 W with the arrangement center S0 as a center therebetween. In other words, the distances between the centers of the light receiving regions of the four light receiving elements of the first light receiver PD1 to the fourth light receiver PD4, and the arrangement center S0, are the same as a distance W. Furthermore, in this embodiment, the distance W from the center of the light receiving regions of the first light receiver PD1, the second light receiver PD2, the third light receiver PD3, and the fourth light receiver PD4 to the arrangement center S0, is greater than a width w of the first light receiver PD1, the second light receiver PD2, the third light receiver PD3, and the fourth light receiver PD4. In a case where a virtual axis passing through the center of the light receiving region of the first light receiver PD1, the arrangement center S0, and the center of the light receiving region of the third light receiver PD3 is set to an x axis, and a virtual axis passing through the center of the light receiving region of the second light receiver PD2, the arrangement center S0, and the center of the light receiving region of the fourth light receiver PD4 is set to a y axis, the x axis and the y axis are orthogonal to each other on the front surface 52A of the second portion 52. That is, on the front surface 52A of the second portion 52, an angle θ1 formed by the center of the light receiving region of the first light receiver PD1 and the center of the light receiving region of the second light receiver PD2, is 90°. Similarly, an angle θ2 formed by the center of the light receiving region of the second light receiver PD2 and the center of the light receiving region of the third light receiver PD3, an angle θ3 formed by the center of the light receiving region of the third light receiver PD3 and the center of the light receiving region of the fourth light receiver PD4, and an angle θ4 formed by the center of the light receiving region of the fourth light receiver PD4 and the center of the light receiving region of the first light receiver PD1, are 90°. Thus, the first light receiver PD1, the second light receiver PD2, the third light receiver PD3, and the fourth light receiver PD4 are equally arranged at 90° intervals, on the same circumference with the arrangement center S0 as the center of a circle, on the front surface 52A. An xy plane of the x axis and the y axis is orthogonal to a z axis connecting the emitting point 41S of the light generated by the generator 41 and the arrangement center S0. That is, in a case where the front surface 52A is viewed from the generator 41 side along a z axis direction, the emitting point 41S overlaps with the arrangement center S0. That is, a straight line L2 (refer to FIG. 13), which is a normal line of a predetermined plane (for example, the front surface 52A of the second portion 52) passing through one point (the arrangement center S0), passes through the center of the emitting point 41S of the light generated by the generator 41. Thus, the first light receiver PD1, the second light receiver PD2, the third light receiver PD3, and the fourth light receiver PD4 are arranged at the same distance from the emitting point 41S of the light emitted from the generator 41.

The detector 35 detects changes in the detection target (for example, an electromagnetic wave such as light), which occurs due to changes in a physical amount in the detection region. The changes in the physical amount, for example, occur due to the rotation of the motion body existing in the detection region. Specifically, for example, as illustrated in FIG. 1 to FIG. 3, the optical scale 11 of the rotor 10 is provided in the detection region. The sensor 31 is a sensor performing output depending on a change in a detection result of the detection target due to the rotation of the optical scale 11 as the motion body. That is, the sensor 31 functions as a rotary encoder detecting angle positions of a turning motion body on the rotor 10. In this embodiment, the sensor 31 detects rotation angles of the rotating body connected to the rotor 10, but the sensor 31 is capable of detecting not only the rotation angles of the rotating body, but also turning angles of the turning motion body that is turned in a range of less than 360°.

One of the first portion 51 and the second portion 52 is smaller than the other. Specifically, for example, as illustrated in FIG. 6 and FIG. 7, the diameter of the circular arc-like first portion 51 in this embodiment is substantially equal to the diameter of the circular second portion 52. However, the first portion 51 is in the shape of a semicircular arc in which a semicircular cut-out portion 51a is provided on an inner circumference side of a semicircular FPC. For this reason, the area of the first portion 51 in the substrate 50 is smaller than the area of the second portion 52. The cut-out portion 51a is provided to set the shaft 12 and the substrate 50 to be in a non-contact state.

The rotor 10 includes the optical scale 11 that is a member having a circular plate shape illustrated in FIG. 5 (or a polygonal shape). The optical scale 11, for example, is formed of silicon, glass, a polymer material, and the like. The optical scale 11 illustrated in FIG. 5 includes a signal track T1 on one plate surface. The rotor 10 has a plate surface to which the shaft 12 is attached and the other plate surface to which the optical scale 11 is attached. In a case where the optical scale 11 is inclined, but an inclination angle is small, a polarization separation function is not affected. The optical scale 11 in this embodiment functions as a member affecting light by being moved in the detection region that is the space between the generator 41 and the detector 35. The optical scale 11, which is the motion body in this embodiment, is a disk-like member that is rotatably supported through the shaft, but the disk-like member is merely an example of the optical scale 11, and the optical scale 11 is not limited thereto. The shape or the like thereof can be changed as appropriate.

The stator 20 includes a member having light shielding properties, which surrounds bearings 26a and 26b, the shaft 12, the optical scale 11 attached to the end portion of the shaft 12, and the detector 35. Thus, the external optical noise in the stator 20 is suppressed. The stator 20 in this embodiment functions as a housing containing the substrate 50 and the member (the optical scale 11). The housing includes a first member to which a part of the substrate 50 is fixed, and a second member supporting the member such that the member can be moved. Specifically, the stator 20 includes the body 21 functioning as the second member, the chassis 22 functioning as the first member, and a cover 23. The body 21 is a housing rotatably supporting the shaft 12 through the bearings 26a and 26b. An inner circumference of the body 21 is fixed to outer rings of the bearings 26a and 26b, and an outer circumference of the shaft 12 is fixed to inner rings of the bearings 26a and 26b. When the shaft 12 is rotated in accordance with the rotation of a rotary machine such as a motor, the optical scale 11 rotates about a rotation center Zr as an axis center, in tandem with the shaft 12. The body 21 has an opening portion 21a for attaching the chassis 22 on which the substrate 50 is provided, to the body 21. The substrate 50 is fixed to the chassis 22 to abut on at least a part of the surface on a side opposite to the surface on which the detector 35 is provided (the rear surface), of the second portion 52 of the substrate 50. Specifically, as described above, the IC circuit 60 is provided on the rear surface 50B of the substrate 50, as a component included in the sensor 31. The chassis 22, for example, as illustrated in FIG. 11, is shaped to cover the IC circuit 60 of the rear surface from the outside and abut on a circular outer circumferential portion of the second portion 52. The connection portion 53 of the substrate 50, which is bent into a U-shape, is fixed to the chassis 22, and thus, is positioned to be erect from the second portion 52 supported on the chassis 22. Thus, in this embodiment, the second portion 52 is fixed to the chassis 22, and thus, the substrate 50 is fixed to the chassis 22. The cover 23 is a member forming a part of a cylindrical outer circumferential surface of the stator 20. The cover 23 is provided on an opening portion 21a side of the body 21, that is, on a side opposite to a side where a cut-out portion 21b is formed, the cut-out portion 21b being a portion where the harness portion 54 extends from the chassis 22. In a state where the body 21 and the chassis 22 are assembled, the cover 23 is further assembled to cover the opening portion 21a, and thus, the body 21, the chassis 22, and the cover 23 form a cylindrical stator 20, and the inside of the stator 20 is shielded from the external optical noise. Thus, the chassis 22 and the cover 23 function as a lid of the body 21 serving as the housing.

The surface of the first portion 51 on a side opposite to a side facing the detection region adheres to the second member (for example, the body 21). Specifically, the surface (the rear surface 51B) of the first portion 51 on the side opposite to the side facing the detection region adheres to the second member through a plate-like member (for example, the support substrate 65). More specifically, a tape having a surface abutting on the first portion 51 and a surface on the opposite side thereof, both of which have adhesiveness, is attached to the support substrate 65 of this embodiment. The tape is a so-called double-faced tape, and both surfaces have adhesiveness. That is, one surface of the support substrate 65 adheres to the surface (the rear surface 51B) of the first portion 51 on the rear side through the tape. In a state where one surface of the support substrate 65 adheres to the first portion 51, the other surface of the support substrate 65 is in a state of having adhesiveness. The other surface is a surface where the shaft 12 extends from the body 21 and adheres to a surface (hereinafter, referred to as an adhesive surface 21c) located on the chassis 22 side through the tape. Thus, one (in this embodiment, the second portion 52) of the first portion 51 and the second portion 52 is fixed to the first member (the chassis 22). A surface of the other (in this embodiment, the first portion 51) of the first portion 51 and the second portion 52 on a side opposite to a side facing the detection region, adheres to the body 21. In a state where one surface of the plate-like member (for example, the support substrate 65) adheres to the surface (the rear surface 51B) of the other of the first portion 51 and the second portion 52 on the side opposite to the side facing the detection region, the other surface of the plate-like member adheres to the body 21. Furthermore, it is preferred that the plate-like member (for example, the support substrate 65) interposed between the surface (for example, the rear surface 51B) of the other (for example, the first portion 51) of the first portion 51 and the second portion 52 on the side opposite to the side facing the detection region, and the second member (for example, the body 21), have rigidity higher than that of the substrate 50.

In this embodiment, the surface of the first portion 51 on the side opposite to the side facing the detection region adheres to the second member through the support substrate 65. However, such a configuration is merely an example of a specific configuration of adhesion, and is not limited thereto. For example, the rear surface 51B of the first portion 51 may adhere to the adhesive surface 21c through an adhesive agent or a tape (a double-faced tape or the like). Specifically, for example, the adhesive agent may be applied to several points in the vicinity of an outer circumference of the support substrate 65 or an inner circumferential portion thereof, the support substrate 65 and the rear surface 51B of the first portion 51 may be spot-fixed, and the support substrate 65 and the adhesive surface 21c may be spot-fixed. In the spot fixing, the tape may be further used as reinforcement until the adhesive agent is solidified.

In the case of using the adhesive agent, it is only required that the adhesive agent be applied to the second member (for example, the body 21) or to the surface of the other of the first portion 51 and the second portion 52 on the side opposite to the side facing the detection region, and then the second member be allowed to abut on the other thereof to cause the surface of the other on the side opposite to the side facing the detection region to adhere to the second member. Consequently, the assembly of the sensor 31 is more easily performed.

When the shaft 12 of the rotor 10 described above is rotated, as illustrated in FIG. 3, the optical scale 11 is relatively moved, for example, in an R direction with respect to the detector 35. Consequently, the signal track T1 of the optical scale 11 is relatively moved with respect to the detector 35. In the optical scale 11, a polarization direction Pm of a polarizer in the plane is directed in a predetermined direction, and the polarization direction Pm is changed in accordance with a rotation. The detector 35 reads out the signal track T1 of the optical scale 11 illustrated in FIG. 5 by receiving the incident light (transmitted light) 73 incident on the detector 35, which is light obtained by allowing the source light 71 generated by the generator 41 to transmit through the optical scale 11.

The optical encoder 2 includes the sensor 31 and the arithmetic device 3. As illustrated in FIG. 4, the sensor 31 and the arithmetic device 3 are connected to each other. The arithmetic device 3 is connected to a controller 5 of the rotary machine such as the motor.

The optical encoder 2 allows the detector 35 to detect the incident light 73 incident on the detector 35, which is light obtained by allowing the source light 71 to transmit through the optical scale 11. The arithmetic device 3 calculates a relative position between the rotor 10 of the sensor 31 and the detector 35 based on a detection signal of the detector 35 and outputs information on the relative position, as a control signal, to the controller 5 of the rotary machine such as the motor.

The arithmetic device 3 is, for example, a computer such as a personal computer (PC). The arithmetic device 3 includes an input interface 4a, an output interface 4b, a central processing unit (CPU) 4c, a read only memory (ROM) 4d, a random access memory (RAM) 4e, and an internal storage device 4f. The input interface 4a, the output interface 4b, the CPU 4c, the ROM 4d, the RAM 4e, and the internal storage device 4f are connected to each other through an internal bus. Furthermore, the arithmetic device 3 may be configured of a dedicated processing circuit.

The input interface 4a receives an input signal from the detector 35 of the sensor 31 and outputs the input signal to the CPU 4c. The output interface 4b receives a control signal from the CPU 4c and outputs the control signal to the controller 5.

The ROM 4d stores a program such as a basic input output system (BIOS). The internal storage device 4f is, for example, a hard disk drive (HDD), a flash memory, or the like and stores an operating system program or an application program. The CPU 4c implements various functions by executing the programs stored in the ROM 4d or the internal storage device 4f while using the RAM 4e as a work area.

The internal storage device 4f stores a database in which the polarization direction Pm of the optical scale 11 is associated with the output of the detector 35. Alternatively, the internal storage device 4f stores a database in which the value of a distance D (refer to FIG. 13) between the emitting point 41S of the light generated by the generator 41 and the arrangement center S0 (the detector 35) is associated with position information of the optical scale 11.

The signal track T1 illustrated in FIG. 5 is configured such that the arrangement of metal fine lines (wires) g that are referred to as a wire grid pattern, is formed on the optical scale 11 illustrated in FIG. 1. In the optical scale 11, adjacent metal fine lines g are linearly arranged parallel to each other, as the signal track T1. Thus, the optical scale 11 has the same polarization axis obtained regardless of the position to which the source light 71 is applied, and the polarization direction of the polarizer in the plane is directed in one direction.

The optical scale 11 including the metal fine lines g that are referred to as a wire grid pattern increases heat resistance, as compared to a photoinduction type polarization plate. The optical scale 11 locally has a line pattern in which there are no portions that intersect with each other, and thus, the optical scale 11 with high accuracy and less error is obtained. Further, the optical scale 11 can be stably manufactured by batch exposure or a nanoimprint technology, and thus, the optical scale 11 with high accuracy and less error is obtained. Furthermore, the optical scale 11 may be a photoinduction type polarization plate.

A plurality of metal fine lines g are arranged without intersecting with each other. A space between the adjacent metal fine lines g is a transmission region d through which the entire or a part of the source light 71 can be transmitted. In a case where the width of the metal fine line g and an interval between the adjacent metal fine lines g, that is, the width of the metal fine line g and the width of the transmission region d, are sufficiently smaller than the wavelength of the source light 71 of the generator 41, the optical scale 11 can perform polarization separation with respect to the incident light 73 of the source light 71. For this reason, the optical scale 11 includes polarizers of which the polarization directions Pm in the plane are uniform. In a circumferential direction where the optical scale 11 is rotated, the polarization axis of the incident light 73 incident on the detector 35 is changed in accordance with the rotation of the optical scale 11. In this embodiment, the polarization axis is changed by repeating an increase and a decrease with respect to one rotation of the optical scale 11 two times.

It is not necessary for the optical scale 11 to make segments having different polarization directions minute. Then, the optical scale 11 has the uniform polarization direction Pm, and thus, the optical scale 11 has no boundary between regions having different polarization directions Pm. This configuration suppresses a disturbance in a polarization state of the incident light 73, which would be caused due to a boundary. The optical encoder 2 of this embodiment is capable of reducing a probability that erroneous detection or a noise occurs.

Figure 18:
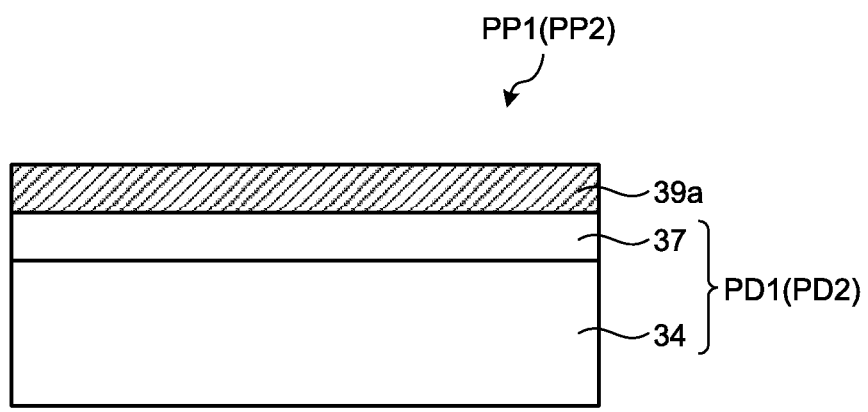
FIG. 18 is an explanatory diagram for illustrating an example of a first light receiver of the detector.
Figure 19:
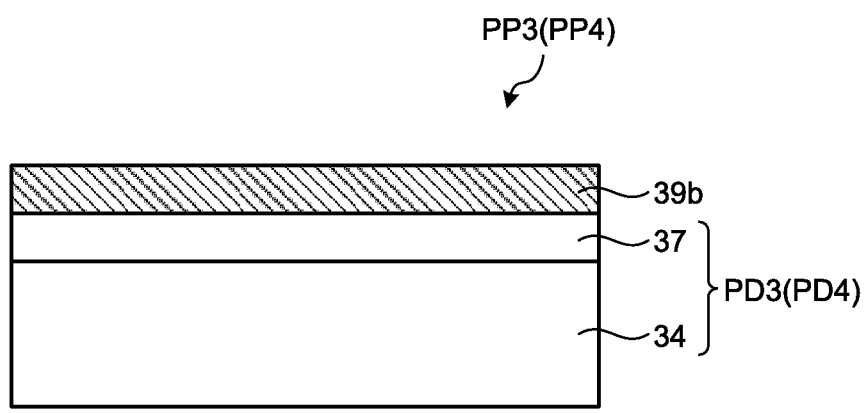
FIG. 19 is an explanatory diagram for illustrating an example of a third light receiver of the detector.

FIG. 18 is an explanatory diagram for illustrating an example of the first light receiver PD1 of the detector 35. FIG. 19 is an explanatory diagram for illustrating an example of the third light receiver PD3 of the detector 35. The generator 41 is a light emitting diode, for example. As illustrated in FIG. 3, the source light 71 emitted from the generator 41 is transmitted through the optical scale 11, and then transmitted through the polarization layer PP1, the polarization layer PP2, the polarization layer PP3, and the polarization layer PP4, as the incident light 73 to be incident on the first light receiver PD1, the second light receiver PD2, the third light receiver PD3, and the fourth light receiver PD4, respectively. In the plan view from the z axis direction, the first light receiver PD1, the second light receiver PD2, the third light receiver PD3, and the fourth light receiver PD4 are arranged around the generator 41. Distances from the first light receiver PD1, the second light receiver PD2, the third light receiver PD3, and the fourth light receiver PD4 to the arrangement center S0 are equal to each other. This structure reduces a calculation load of the CPU 4c functioning as an arithmetic unit.

As illustrated in FIG. 18, the first light receiver PD1 includes a silicon substrate 34, a light receiver 37, and a first polarization layer 39a. As illustrated in FIG. 19, the third light receiver PD3 includes the silicon substrate 34, the light receiver 37, and a second polarization layer 39b. For example, the silicon substrate 34 is an n-type semiconductor, and the light receiver 37 is a p-type semiconductor. Thus, the silicon substrate 34 and the light receiver 37 can constitute a P-N junction photodiode. The first polarization layer 39a and the second polarization layer 39b each can be formed of a photoinduction type polarization layer, a wire grid pattern in which metal fine lines are arranged parallel to each other, or the like. The first polarization layer 39a separates a light component in a first polarization direction from the incident light 73 that is incident on the optical scale 11 illustrated in FIG. 3 from the source light 71. The second polarization layer 39b separates a light component in a second polarization direction from the incident light 73. It is preferred that a polarization axis of the first separated light and a polarization axis of the second separated light be relatively different by 90°. This configuration allows the CPU 4c of the arithmetic device 3 to calculate the polarization angle easily.

Similarly, describing by using FIG. 18 and FIG. 19, the second light receiver PD2 includes the silicon substrate 34, the light receiver 37, and the first polarization layer 39a. As illustrated in FIG. 19, the fourth light receiver PD4 includes the silicon substrate 34, the light receiver 37, and the second polarization layer 39b. For example, the silicon substrate 34 is an n-type semiconductor, and the light receiver 37 is a p-type semiconductor. Thus, the silicon substrate 34 and the light receiver 37 constitute a P-N junction photodiode. The first polarization layer 39a and the second polarization layer 39b each can be formed of a photoinduction polarization layer, a wire grid pattern in which metal fine lines are arranged parallel to each other, or the like. The first polarization layer 39a separates a light component in the first polarization direction from the incident light 73 that is incident on the optical scale 11 illustrated in FIG. 3 from the source light 71. The second polarization layer 39b separates a light component in the second polarization direction from the incident light 73. It is preferred that the polarization axis of the first separated light and the polarization axis of the second separated light be relatively different by 90°. This configuration allows the CPU 4c of the arithmetic device 3 to calculate the polarization angle easily.

The first light receiver PD1, the second light receiver PD2, the third light receiver PD3, and the fourth light receiver PD4 receive light through the respective polarization layers PP1, PP2, PP3, and PP4 separating light components in different polarization directions from the incident light 73. For this reason, it is preferred that the polarization axis of the separation of the polarization layer PP1 and the polarization axis of the separation of the polarization layer PP2 be relatively different by 45°. It is preferred that the polarization axis of the separation of the polarization layer PP2 and the polarization axis of the separation of the polarization layer PP3 be relatively different by 45°. It is preferred that the polarization axis of the separation of the polarization layer PP3 and the polarization axis of the separation of the polarization layer PP4 be relatively different by 45°. It is preferred that the polarization axis of the separation of the polarization layer PP4 and the polarization axis of the separation of the polarization layer PP1 be relatively different by 45°. This configuration allows the CPU 4c of the arithmetic device 3 to calculate the polarization angle easily.

Figure 20:
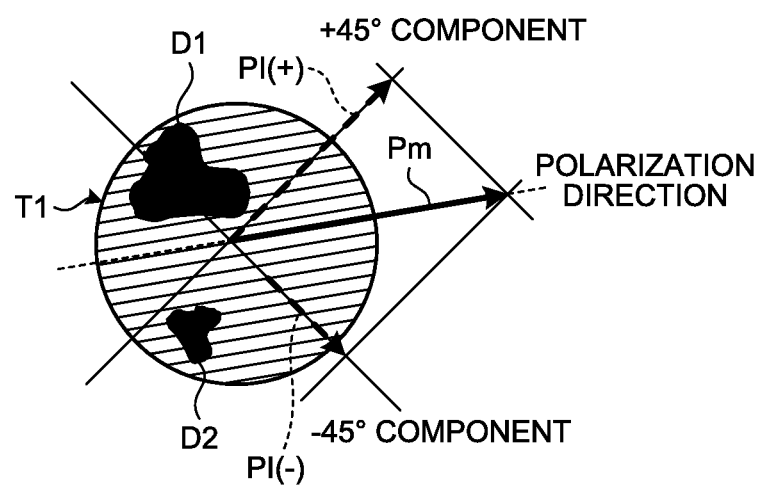
FIG. 20 is an explanatory diagram for illustrating the separation of a polarization component according to the optical scale.
Figure 21:
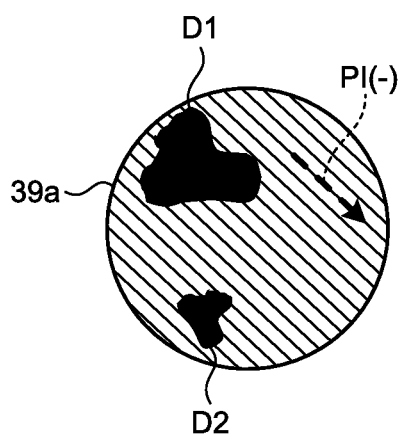
FIG. 21 is an explanatory diagram for illustrating the separation of the polarization component according to the optical scale.
Figure 22:
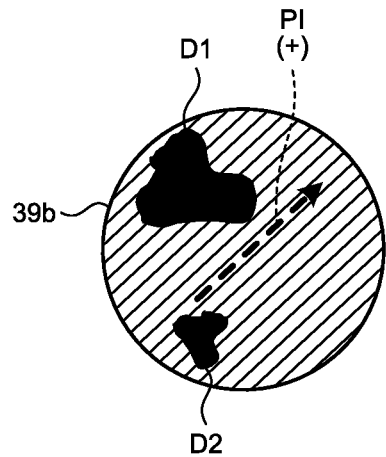
FIG. 22 is an explanatory diagram for illustrating the separation of the polarization component according to the optical scale.

FIG. 20, FIG. 21, and FIG. 22 are explanatory diagrams for illustrating separation of the polarization component of the optical scale 11. As illustrated in FIG. 20, incident light polarized in the polarization direction Pm by the signal track T1 of the optical scale 11 is received. In FIG. 20, there are a foreign substance D1 and a foreign substance D2 in a sensing region. The polarization direction Pm of the incident light can be represented by a light intensity PI(−) of a component in the first polarization direction and a light intensity PI(+) of a component in the second polarization direction. As described above, it is preferred that the first polarization direction and the second polarization direction be directions different by 90°, and the first polarization direction and the second polarization direction are, for example, a +45° component and a −45° component with respect to a reference direction. In FIG. 20, FIG. 21, and FIG. 22, it is illustrated that an axis direction of a wire grid is parallel to the paper plane. In a case where the optical scale 11 is inclined at the same angle with respect to the paper plane, but the inclination angle is small, the polarization separation function is not affected. That is, the optical scale 11 functions as a polarization separation element even in the case of being inclined with respect to a rotation axis.

As illustrated in FIG. 21, the first light receiver PD1 performs sensing through the first polarization layer 39a separating a component in the first polarization direction from the incident light, and thus, senses the light intensity PI(−) of the component in the first polarization direction. As illustrated in FIG. 22, the third light receiver PD3 performs sensing through the second polarization layer 39b separating a component in the second polarization direction from the incident light, and thus, senses the light intensity PI(+) of the component in the second polarization direction. Similarly, as illustrated in FIG. 21, the second light receiver PD2 performs sensing through the first polarization layer 39a separating a component in the first polarization direction from the incident light, and thus, senses the light intensity PI(−) of the component in the first polarization direction. As illustrated in FIG. 22, the fourth light receiver PD4 performs sensing through the second polarization layer 39b separating a component in the second polarization direction from the incident light, and thus, senses the light intensity PI(+) of the component in the second polarization direction.

Figure 23:
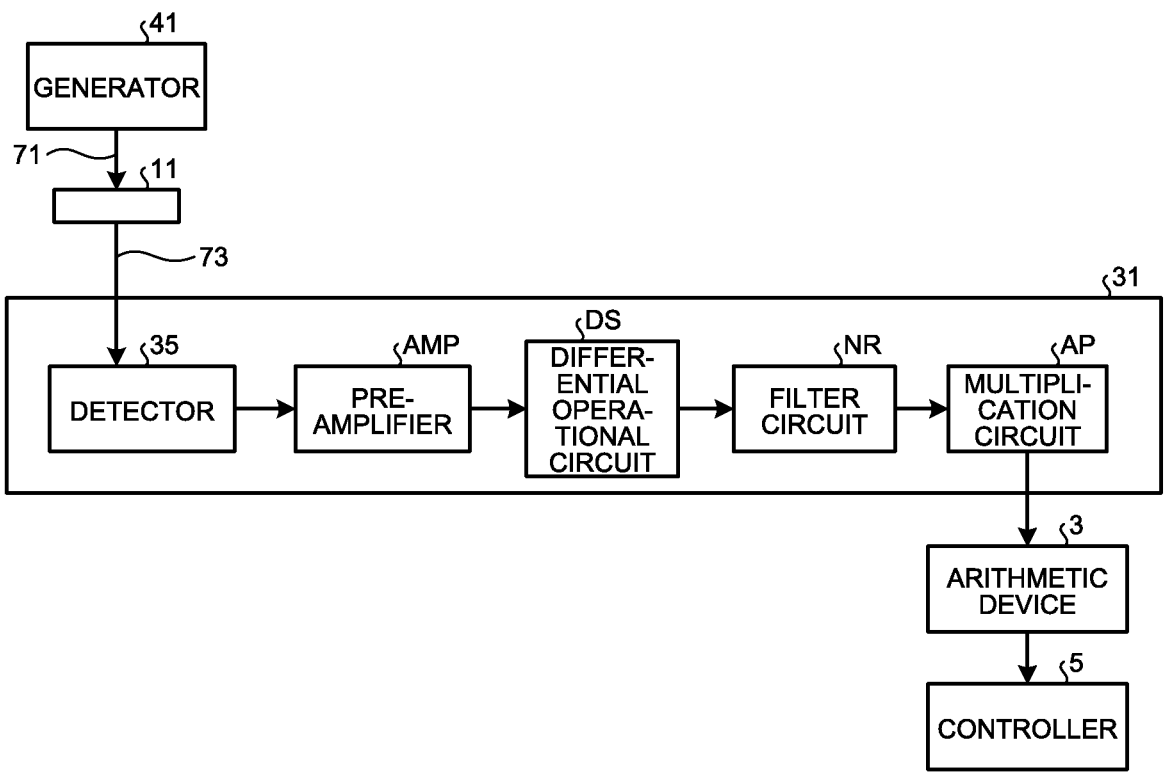
FIG. 23 is a functional block diagram of the optical encoder.
Figure 24:
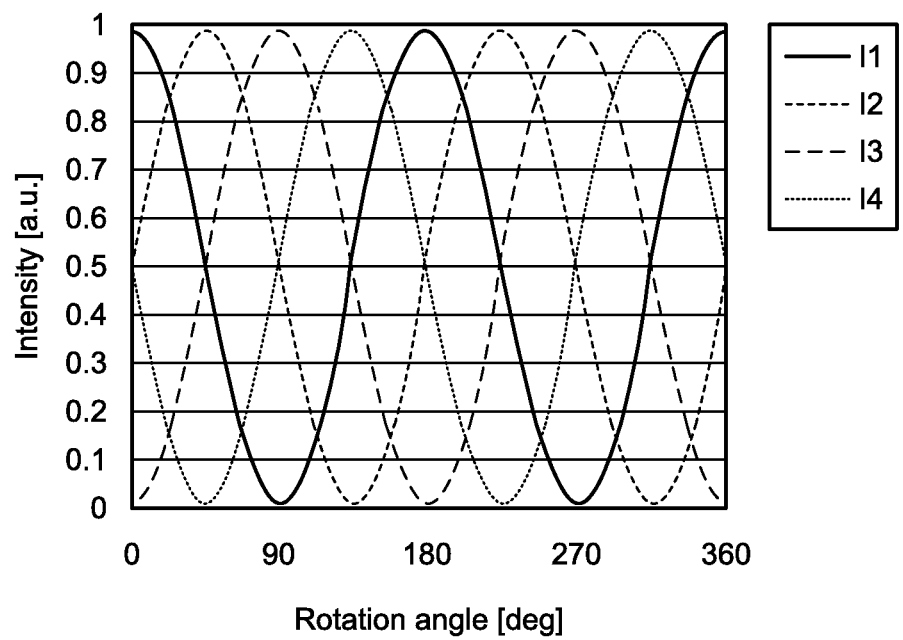
FIG. 24 is an explanatory diagram for illustrating a rotation angle of the optical scale and a light intensity change of the polarization component of each of the light receivers.

FIG. 23 is a functional block diagram of the optical encoder 2. FIG. 24 is an explanatory diagram for illustrating the rotation angle of the optical scale 11 and a light intensity change of the polarization component of each of the light receivers. As illustrated in FIG. 23, the generator 41 emits light based on a reference signal and irradiates the optical scale 11 with the source light 71. The incident light 73 that is the transmitted light is received by the detector 35. The differential operational circuit DS performs differential operational processing using the detection signal that is output from the detector 35 and is amplified by the pre-amplifier AMP. The pre-amplifier AMP can be omitted according to the size of the output of the detector 35.

The differential operational circuit DS acquires the light intensity PI(−) of the component (the first separated light) in the first polarization direction, and the light intensity PI(+) of the component (the second separated light) in the second polarization direction, which are the detection signals of the detector 35. The outputs of the first light receiver PD1, the second light receiver PD2, the third light receiver PD3, and the fourth light receiver PD4, corresponding to the light intensity PI(−) and the light intensity PI(+), are, for example, light intensities I1, I2, I3, and I4 of which the phase is shifted in accordance with the rotation of the optical scale 11 as illustrated in FIG. 24.

The differential operational circuit DS calculates a differential signal Vc and a differential signal Vs, which depend on the rotation of the optical scale 11, from the light intensity PI(−) of the component in the first polarization direction and the light intensity PI(+) of the component in the second polarization direction, according to Expression (1) and Expression (2). The differential signal Vc is a signal corresponding to a so-called cosine (cos) component, and the differential signal Vs is a signal corresponding to a so-called sine (sin) component.

$$Vc=(I1-I3)/(I1+I3) \quad (1)$$

$$Vs=(I2-I4)/(I2+I4) \quad (2)$$

Thus, the differential operational circuit DS calculates the sum [I1+I3] of light intensities and a difference [I1−I3] between the light intensities on the basis of the light intensity I1 and the light intensity I3, and then calculates the differential signal Vc by dividing the difference [I1−I3] between the light intensities by the sum [I1+I3] of the light intensities. The differential operational circuit DS calculates the sum [I2+I4] of the light intensities and a difference [I2−I4] between the light intensities on the basis of the light intensity I2 and the light intensity I4, and then calculates the differential signal Vs by dividing the difference [I2−I4] between the light intensities by the sum [I2+I4] of the light intensities. A parameter affected by the light intensity of the source light 71 is not included in the differential signals Vc and Vs calculated by Expression (1) and Expression (2), and thus, the output of the sensor 31 can reduce the influence of the distance between the detector 35 and the optical scale 11, variations in the light intensity of the generator 41, or the like. The differential signals Vc and Vs are a function of a rotation angle β of the polarization axis of the optical scale 11 (hereinafter, referred to as a polarization angle), which is the rotation angle of the optical scale 11. However, in a case where auto power control (APC) of controlling a light amount of a light source provided in the generator 41 to be constant is provided, the division described above is not necessary.

Figure 25:
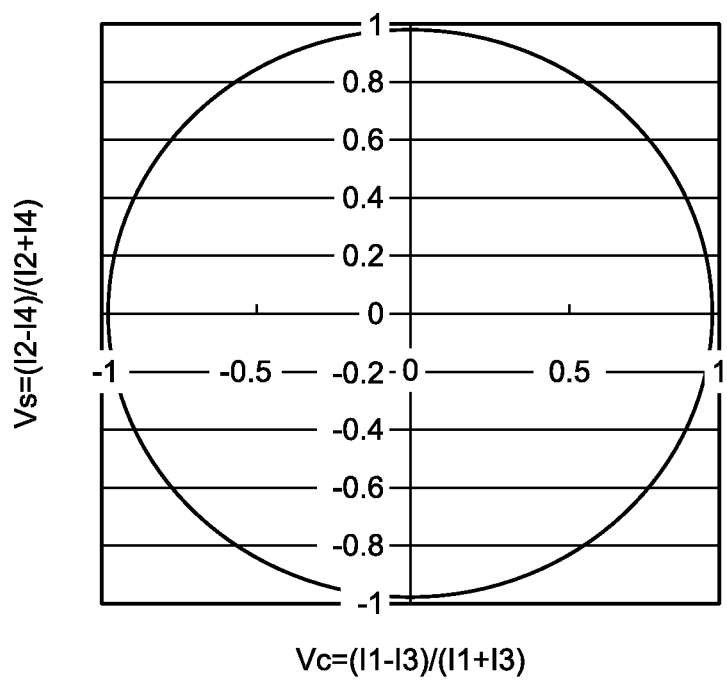
FIG. 25 is an explanatory diagram for illustrating a relationship between the rotation angle of the optical scale and a Lissajous angle.

As illustrated in FIG. 23, the differential signals Vc and Vs are input to the filter circuit NR, and the noise is eliminated. Next, the multiplication circuit AP calculates a Lissajous pattern illustrated in FIG. 25 from the differential signals Vc and Vs to specify the absolute angle of the rotation angle of the rotor 10 rotated from the initial position. The differential signals Vc and Vs are differential signals of which the phase is shifted by λ/4, and thus, a Lissajous pattern in which a cosine curve of the differential signal Vc is set to a horizontal axis, and a sine curve of the differential signal Vs is set to a vertical axis, is calculated, and a Lissajous angle is determined in accordance with the rotation angle. For example, in a case where rotor 10 is rotated once, the Lissajous pattern illustrated in FIG. 25 makes two circles. The arithmetic device 3 has a function of storing whether a rotation position of the optical scale 11 is in a range of greater than or equal to 0° and less than 180° or in a range of greater than or equal to 180° and less than 360°. Accordingly, the optical encoder 2 can be an absolute encoder capable of calculating the absolute position of the rotor 10.

Figure 26:
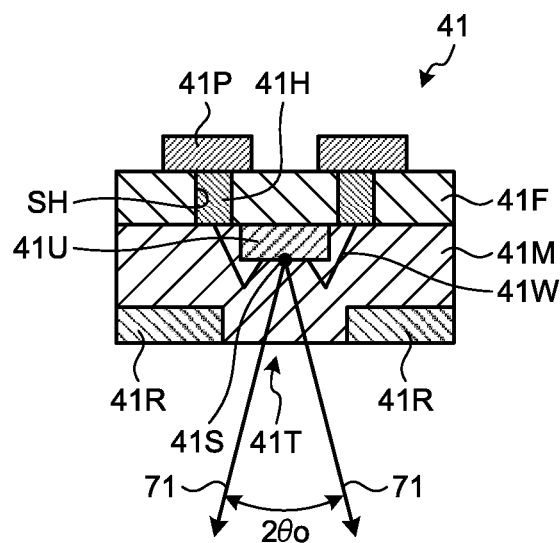
FIG. 26 is a diagram for illustrating the generator.

FIG. 26 is a diagram for illustrating the generator 41. The generator 41 illustrated in FIG. 26 is, for example, a light emitting element packaged with the light emitting device 41U such as a light emitting diode. The light emitting device 41U may have other configurations. Specifically, for example, the light emitting device 41U may be a laser light source such as a vertical resonator surface-emitting laser, a filament, or the like. The generator 41 includes a base substrate 41F, a through conductive layer 41H embedded in a through hole SH, an external electrode 41P electrically connected to the through conductive layer 41H, the light emitting device 41U mounted on the base substrate 41F, a bonding wire 41 W conductively connecting the light emitting device 41U and the through conductive layer 41H together, a sealing resin 41M protecting the light emitting device 41U, and a light shielding film 41R.

The light shielding film 41R of the generator 41 has a function as a diaphragm for the source light 71, in which the source light 71 emitted from the light emitting device 41U is directed to a region of an emitting surface 41T. The emitting surface 41T does not include a lens surface, and a light distribution of the source light 71 represents a light distribution of a predetermined angle 2θo with respect to a sectional surface of the emitting surface 41T. The angle 2θo of the light distribution depends on the generator 41. The angle 20o is, for example, 30°, but can be set to an angle greater or less than 30°.

The sensor 31 can be configured using the generator 41 not provided with a lens. Reducing the distance D between the emitting point 41S of the light generated by the generator 41 and the arrangement center S0 (the detector 35) improves an SN ratio. The distance W to each of the first light receiver PD1, the second light receiver PD2, the third light receiver PD3, and the fourth light receiver PD4 can be arranged in a region where the influence of the diffused light of the generator 41 is reduced and light can be received. For this reason, measurement accuracy of the sensor 31 and the optical encoder 2 is improved. It is also possible to use the generator 41 provided with a lens.

Figure 27:
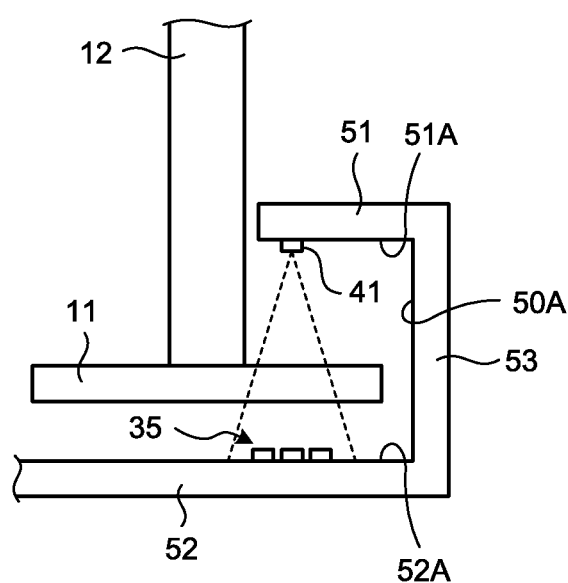
FIG. 27 is a diagram illustrating an example of a relationship between a generation region of light from the generator and the positions of the detector and a shaft.

FIG. 27 is a diagram illustrating an example of a relationship between an emitting region of the light from the generator 41 and the positions of the detector 35 and the shaft 12. In this embodiment, the detection target that is generated by the generator 41 and is detected by the detector 35, is light. An emitting angle (the angle 2θo described above) of the source light 71 of the generator 41 can be arbitrarily set in accordance with the design. Accordingly, as illustrated in FIG. 27, while all of the light receiving regions of the detector 35 are included in the region corresponding to the emitting angle of the source light 71, it is possible not to include the connection portion 53 and the shaft 12 therein. However, it is difficult to keep the source light 71 emitted from the light emitting diode as a light source completely within the emitting region to make light leakage be zero. In addition, in consideration of the reflected light after emitting, or the like, it is difficult to completely prevent the light other than the direct source light 71 (for example, irregularly reflected light or the like) from being incident on the detector 35. Therefore, in this embodiment, in order to reduce the reflected light, the surface of the substrate 50 on which the light emitting element and the light receiving elements are provided, is subjected to a light antireflection treatment. Specifically, of the plate surfaces of the substrate 50, a coating treatment of coating at least the surface (the front surface 50A) on a side where the generator 41 and the detector 35 are provided with an antireflection material having light absorbing properties, such as a black coating material, can be adopted as the light antireflection treatment.

In consideration of a possibility that light is reflected on the outer circumferential surface of the shaft 12, the shaft 12 may be subjected to the antireflection treatment. In this case, the sensor 31 includes a scale (the optical scale 11) and a rotation support portion (the body 21 of the stator 20) and is subjected to the light antireflection treatment. The scale affects light by being rotatably moved in the detection region that is the space between the generator 41 and the detector 35, and the rotation support portion includes the shaft 12 that rotatably supports the scale. Specifically, for example, the outer circumferential surface of the metal shaft 12 can be subjected to a plating treatment using a black oxide film, the above-mentioned coating treatment, or the like, as the light antireflection treatment. With a similar idea, the inner circumferential surface of the stator 20 containing the optical scale 11 and the substrate 50 may be subjected to the antireflection treatment.

Figure 28:
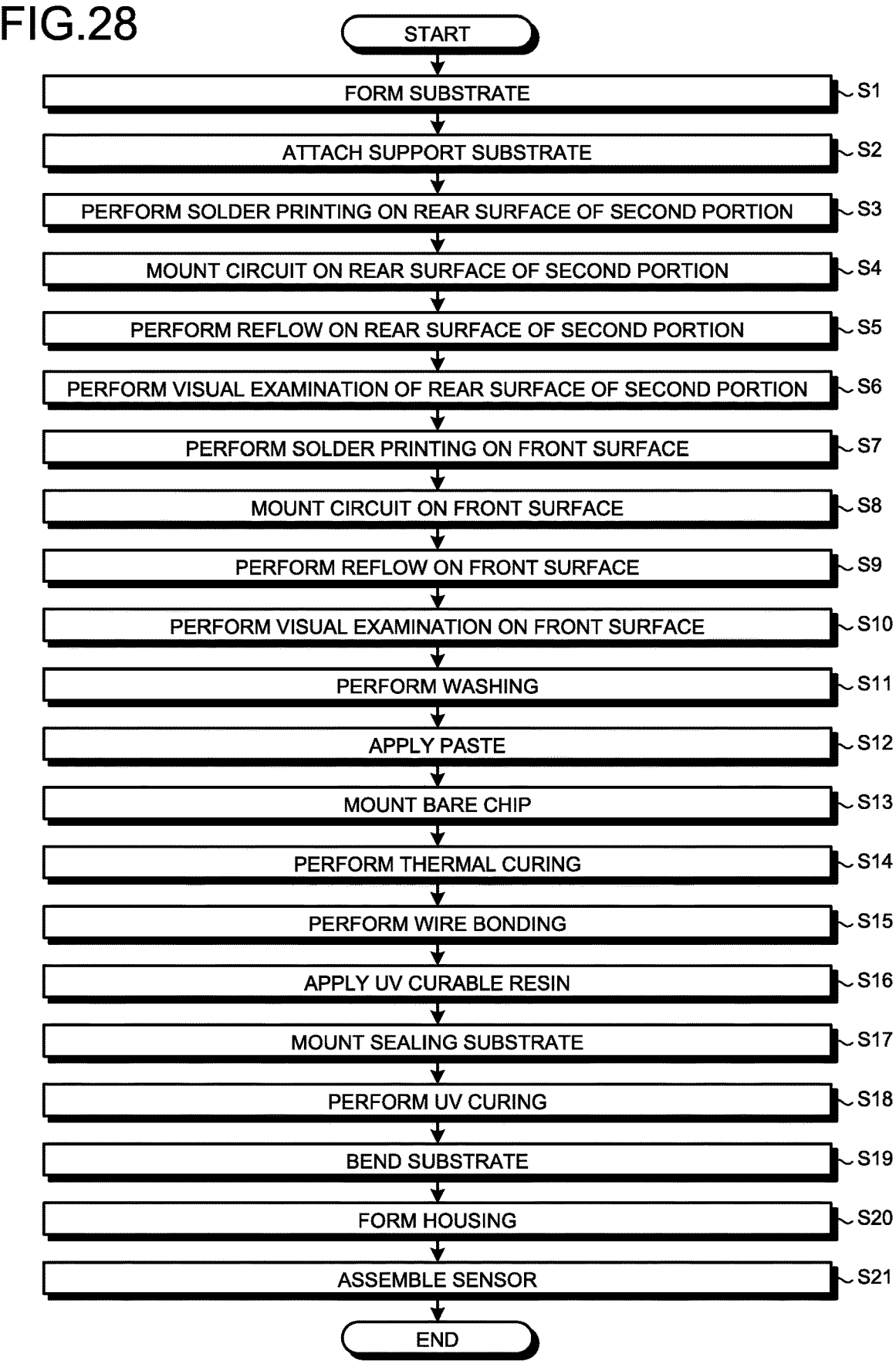
FIG. 28 is a flowchart of an exemplary process of manufacturing the sensor.

Next, a manufacturing method of the sensor 31 will be described with reference to a flowchart of FIG. 28. FIG. 28 is a flowchart of an exemplary process of manufacturing the sensor 31. Hereinafter, an operation process mainly performed by a manufacturing operator or a manufacturing machine operated by the manufacturing operator will be described. First, the substrate 50, in which the first portion 51 to be provided with the generator 41 is integrated with the second portion 52 to be provided with the detector 35, is formed (Step S1). Specifically, for example, as illustrated in FIG. 14, the FPC, which includes the semicircular arc-like first portion 51, the circular second portion 52, the connection portion 53 connecting the first portion 51 and the second portion 52 together, the harness portion 54 extending from the first portion 51 to a side opposite to the connection portion 53, and the bent portions 55a and 55b for bending the substrate 50, is formed. In this step, the signal line, the power line, the ground pattern 80, and the like, to be connected to various circuits to be mounted on the substrate 50 in the subsequent steps, are formed on the FPC. Here, for example, as illustrated in FIG. 9, in the ground pattern 80, the ground pattern 81 of the bent portion 55a and the ground pattern 82 of the bent portion 55b are formed to be narrower than at least the ground pattern 83 of the first portion 51 and the ground pattern 84 of the second portion 52. Thus, the manufacturing method of the sensor 31 (the optical sensor) according to this embodiment includes a step of preparing the substrate 50 including the first portion 51 to be provided with the generator 41, the second portion 52 to be provided with the detector 35, the bent portions 55a and 55b to be bent between the first portion 51 and the second portion 52 such that the generator 41 and the detector 35 face each other, and the ground pattern 80 provided in the portion including the first portion 51, the second portion 52, and the bent portions 55a and 55b. The front surface of the FPC is subjected to the antireflection treatment. At this time, the terminal portion to which the wiring of various circuits including the generator 41 and the detector 35 is to be connected later, is not subjected to the antireflection treatment.

Next, various components are attached to the substrate 50. Specifically, for example, first, the support substrate 65 is attached to the rear surface 51B of the first portion 51 (Step S2). Next, various steps for providing the IC circuit 60 on the rear surface 52B of the second portion 52 are performed. More specifically, solder printing for mounting the IC circuit 60 on the rear surface 52B of the second portion 52 (Step S3), mounting the IC circuit 60 on the rear surface 52B of the second portion 52 (Step S4), reflow by heating the rear surface 52B of the second portion 52 after being subjected to the mounting at Step S4 (Step S5), a visual examination of the soldering of the rear surface 52B of the second portion 52 (Step S6), and the like, are performed, and thus, the IC circuit 60 is provided on the rear surface 52B of the second portion 52. Thus, the manufacturing method of the sensor 31 (the optical sensor) according to this embodiment includes a step of attaching the plate-like support member (the IC circuit 60 and the support substrate 65) for keeping a surface (the front surfaces 51A and 52A) on which an electronic component is provided flat, to the surface (the rear surfaces 51B and 52B) on the rear side of each of the surface (the front surface 51A) of the first portion 51 on which an electronic component including the generator 41 is provided and the surface (the front surface 52A) of the second portion 52 on which an electronic component including the detector 35 is provided.

Next, various steps for attaching the component to the front surface 50A of the substrate 50 are performed. More specifically, solder printing for mounting the generator 41 and a part of the component 61 on the front surface 51A of the first portion 51, and for mounting the detector 35 on the front surface 52A of the second portion 52 (Step S7), mounting various circuits including the generator 41 and the detector 35 on the front surface 50A (Step S8), reflow by heating the front surface 50A after being subjected to the mounting at Step S8 (Step S9), a visual examination of the soldering of the front surface 50A (Step S10), and the like, are performed, and thus, a component that is subjected to wiring connection by soldering is attached to the front surface 50A. After that, the substrate 50 is washed (Step S11). After the substrate 50 is washed, a paste (for example, an Ag paste) for attachment of the bare chip as a part of the component 61 is applied onto the front surface 50A (Step S12), the bare chip is mounted (Step S13), and the bare chip is fixed by thermal curing (Step S14). Then, the bare chip and the wiring of the substrate 50 are connected together by wire bonding (Step S15). After the wire bonding, the front surface 50A of the substrate 50 is coated with a resin that is cured by an ultraviolet ray (a UV curable resin) (Step S16), a sealing substrate (for example, a glass substrate) is mounted on the front surface 50A coated with the UV curable resin (Step S17), and a UV curing treatment of curing the UV curable resin by applying an ultraviolet ray thereto is performed (Step S18). Thus, the manufacturing method of the sensor 31 (the optical sensor) according to this embodiment includes a step of providing the generator 41 on the first portion 51 and of providing the detector 35 on the second portion 52. Here, in a case where the surface (the rear surface 50B) of the substrate 50 on a side where the plate-like member (for example, the support substrate 65) is provided is defined as one surface, the generator 41 and the detector 35 are provided on the other surface (the front surface 50A). One or more electronic components (for example, the detector 35 and the component 61) provided on the front surface 52A of the second portion 52 are arranged within a region corresponding to a region in the rear surface 52B where the package of the IC circuit 60 is arranged.

The wire bonding is, for example, Au wire bonding using a gold wire, but the Au wire bonding is merely an example, the wire bonding is not limited thereto, and can be changed as appropriate. Instead of the wire bonding, tape automated bonding (TAB) may be used, or the wiring of the substrate may be soldered with the bare chip as a flip chip.

Next, the generator 41 and the detector 35 are made to face each other. Specifically, for example, the substrate 50 is bent in the bent portions 55*a* and 55*b* such that the surface of the first portion 51, on which the generator 41 is provided (the front surface 51A), and the surface of the second portion 52, on which the detector 35 is provided (the front surface 52A), are parallel to each other and face each other (Step S19). Thus, the manufacturing method of the sensor 31 (the optical sensor) according to this embodiment includes a step of bending the substrate 50, which is a flexible substrate (FPC), in the bent portions 55*a* and 55*b* such that the surface (the front surface 51A) of the first portion 51, on which the generator 41 is provided, and the surface (the front surface 52A) of the second portion 52, on which the detector 35 is provided, face each other.

As exemplified in the steps of Steps S7 to S14 described above, the manufacturing method of the sensor 31 (the optical sensor) according to this embodiment includes a step of providing the generator 41 on the first portion 51 and of providing the detector 35 on the second portion 52. It is preferred that the first light receiver PD1 to the fourth light receiver PD4 included in the detector 35 be arranged in different positions on a predetermined plane (for example, the front surface 52A), that the distances (the distances W) from the four light receiving elements to one point on the predetermined plane be equal to each other, and that the four line segments connecting one point and the centers of the light receiving regions of the four light receiving elements form right angles to each other. Further, it is preferred that, with the substrate 50 bent, the straight line L2 that is the normal line of a predetermined plane (the front surface 52A) passing through one point (the arrangement center S0), pass through the center of the emitting point 41S of the light generated by the generator 41. It is preferred that the generator 41 and the detector 35 be provided in consideration of such a condition. Specifically, the configuration satisfies a first condition in which the first axis LA serving as the bending axis of the bent portion 55*a* is parallel to the second axis LB serving as the bending axis of the bent portion 55*b*. The configuration satisfies a second condition in which, on the plane before the substrate 50 is bent, the distance (the distance W1) between the first axis LA and the first point (for example, the emitting point 41S) that is the generation center point of the detection target of the generator 41, is equal to the distance (the distance W2) between the second axis LB and the second point (for example, the arrangement center S0) that is either the center of the detection region of the detection target of the detector 35 or the arrangement center of the plurality of detection regions of the detector 35. The configuration satisfies a third condition in which the first point and the second point are arranged on the same straight line (for example, the straight line L1), which intersects with (or three-dimensionally intersects with) the first axis LA and the second axis LB at a right angle in the substrate 50 before being bent. The wiring of the generator 41 and the detector 35 is provided in forming the substrate 50, the first axis LA and the second axis LB are determined, and the arrangement of the generator 41 and the detector 35 when they are mounted is determined, such that the first condition, the second condition, and the third condition are satisfied.

Next, the housing (for example, the stator 20) is formed (Step S20). Specifically, the housing including the first member (for example, the chassis 22) to which a part of the substrate 50 is fixed and the second member (for example, the body 21) movably supporting a member (for example, the optical scale 11), is formed. The member (for example, the optical scale 11) affects light by being moved in the detection region that is the space between the generator 41 and the detector 35. In this embodiment, the cover 23 is further formed as one configuration of the stator 20 that is the housing containing the substrate 50 and the optical scale 11, but such a configuration is merely an example of a specific configuration of the housing, and is not limited thereto. For example, the cover 23 may be integrated with the chassis 22. The shaft 12 provided in the body 21 that is the second member, may be a shaft of which the outer circumferential surface is subjected to the antireflection treatment. The inner circumferential surface of the stator 20, which is formed to contain the substrate 50 and the optical scale 11, may be subjected to the antireflection treatment.

After that, a step relevant to the assembly of the sensor 31 (Step S21) is performed. Hereinafter, the step relevant to the assembly in the manufacturing of the sensor 31 will be described. In the manufacturing of the sensor 31, the substrate 50 and the motion body (for example, the optical scale 11) are relatively moved such that the motion body enters the region between the generator 41 and the detector 35 (the detection region). Specifically, in the manufacturing of the sensor 31, for example, as illustrated in FIG. 15 and FIG. 16, the substrate 50 and the motion body are relatively moved such that the motion body enters the region (the detection region) from a side opposite to the connection portion 53. In the substrate 50, the connection portion 53 is positioned on a side opposite to the harness portion 54 with the second portion 52 therebetween, and thus, in this embodiment, the substrate 50 and the motion body are relatively moved such that the motion body enters the detection region from the harness portion 54 side.

More specifically, with respect to a predetermined plane (for example, the front surface 52A of the second portion 52), the plate surfaces of the first portion 51, the second portion 52, and the optical scale 11 of the bent substrate 50 are made to be along the predetermined plane. In this state, at least one of the substrate 50 and the stator 20 including the optical scale 11 is moved in the direction along the predetermined plane, and thus, the optical scale 11 is provided in the detection region. For example, in a position where the optical scale 11 is provided, in a columnar outer circumferential surface of the stator 20, the opening portion (for example, the opening portion 21a) into which the substrate 50 can be inserted in the direction along the plate surface of the optical scale 11, is provided. The substrate 50 is made to enter the opening portion, and thus, the optical scale 11 is provided in the detection region. In this case, the substrate 50 enters the opening portion 21a by being inserted from the harness portion 54 side. Further, the semicircular arc-like first portion 51 enters a side of the optical scale 11 where the shaft 12 is located, and the circular second portion 52 enters a side of the optical scale 11 where the shaft 12 is not located.

In this embodiment, the first portion 51 and the second portion 52 are parallel to each other. Consequently, in the manufacturing method of the sensor 31 according to this embodiment, which includes a step of, assuming that the front surface 52A of the second portion 52 is a predetermined plane, moving at least any one of the substrate 50 and the stator 20 including the optical scale 11 in the direction along the predetermined plane, a relative movement direction of the substrate 50 and the motion body is along the first portion 51 and the second portion 52.

The step relevant to the assembly in the manufacturing of the sensor 31 will be described below by using an actual example. First, the substrate 50 is attached to the first member (the chassis 22) that is one of a plurality of members included in the housing (the stator 20) of the sensor 31. After that, the housing is assembled by bringing the first member closer to the second member (the body 21) that is one of the plurality of members included in the housing and supports the motion body, and the substrate 50 and the motion body are relatively moved such that the motion body enters the region between the generator 41 and the detector 35. Specifically, as illustrated in FIG. 11, the second portion 52 of the substrate 50 is fixed to the chassis 22. Then, as illustrated in FIG. 15, the chassis 22 to which the second portion 52 is fixed, and the body 21 in which the rotor 10 is rotatably provided, are provided so as to have a position relationship where the first portion 51 and the second portion 52, and the optical scale 11 are substantially parallel to each other, and where the optical scale 11 is positioned in the detection region between the first portion 51 and the second portion 52. That is, the chassis 22 and the body 21 are provided so as to have a position relationship where the first portion 51 and the second portion 52, and the optical scale 11 are aligned in a predetermined plane. In such a position relationship, the body 21 and the chassis 22 are brought closer to each other along the predetermined plane such that the chassis 22 enters the body 21 from the opening portion 21a of the body 21, and then the body 21 and the chassis 22 are made to abut on each other. Thus, the body 21 and the chassis 22 are assembled. Consequently, the optical scale 11 is provided in the detection region. Here, in bringing the body 21 closer to the chassis 22 in the position relationship where the optical scale 11 is positioned in the detection region between the first portion 51 and the second portion 52, it is preferred that the support substrate 65 adhering to the rear surface 51B of the first portion 51 be kept from abutting on the adhesive surface 21c of the body 21. Then, in a step where the body 21 and the chassis 22 are assembled by causing the body 21 to abut on the chassis 22, the chassis 22 is pushed up such that the chassis 22 becomes closer to the adhesive surface 21c, and thus, the support substrate 65 and the adhesive surface 21c abut on each other and adhere to each other. According to such an assembly method, in a state where one surface of the plate-like member (the support substrate 65) adheres to the surface (for example, the rear surface 51B) of the other (for example, the first portion 51) on a side opposite to a side facing the detection region, the other surface of the plate-like member adheres to the second member (for example, the body 21). It is preferred that various specific design matters such as the length of the connection portion 53, an extension length of the shaft 12 on the adhesive surface 21c side, and the thickness of the support substrate 65, be set such that the body 21 and the chassis 22 can be assembled.

The cut-out portion 51a keeps the shaft 12 from being in contact with the substrate 50 even after the body 21 and the chassis 22 are assembled. This configuration inhibits contact between the shaft 12 and substrate 50 and prevents the rotation of the shaft 12 from being hindered. Thus, in the manufacturing method of the sensor 31 according to this embodiment, a cutout (the cut-out portion 51a) for causing the shaft 12 and the substrate 50 to be in a non-contact state, in a state where the motion body enters the region between the generator 41 and the detector 35, is provided in the first portion 51.

The body 21 and the chassis 22 are assembled, and then, the harness portion 54 extends from the cut-out portion 21b provided on a side opposite to the opening portion 21a of the body 21. After that, in a case where the cover 23 is separated from the chassis 22, the cover 23 is attached to the body 21 so as to cover the opening portion 21a of the body 21. That is, in the manufacturing method of the sensor 31 according to this embodiment, the first member (the chassis 22) and the second member (the body 21) are assembled, and then, an entrance (the opening portion 21a) in the second member through which the substrate 50 enters is covered with a covering member (the cover 23). In FIG. 14 to FIG. 17, the illustration of a part of the circuits such as the detector 35 is omitted, but in fact, various circuits including the detector 35 have been mounted.

In a case where the connector CNT is mounted in advance on the substrate 50, for example, in a positioning step of the body 21 and the chassis 22 before the body 21 and the chassis 22 are relatively moved, the body 21 and the chassis 22 may have a position relationship where the tip end side of the harness portion 54 is exposed to the outside the body 21. Thus, when the body 21 and the chassis 22 are relatively moved such that the motion body enters the region between the generator 41 and the detector 35, the connector CNT is prevented from being caught at the cut-out portion 21b without passing therethrough, and thus excellent assembly is performed. The connector CNT may be provided in the substrate 50 before the housing (the stator 20) is assembled. The connector CNT may be provided after the housing is assembled.

Thus, the housing of the sensor 31 includes the first member (the chassis 22) to which the substrate 50 is attached and the second member (the body 21) in which the motion body is provided. The second member and the first member are relatively moved along a predetermined direction and abut on each other, and thus, the housing is assembled. The predetermined direction is a direction in which the motion body can enter the region (the detection region) between the generator 41 and the detector 35.

As described above, according to this embodiment, the substrate 50 includes the first portion 51 on which the generator 41 is provided and the second portion 52 on which the detector 35 is provided, thereby enabling to position the generator 41 and the detector 35 by a simple operation such as bending the substrate 50. Thus, according to this embodiment, the positioning between the generator 41 and the detector 35 is more easily performed. Such positioning can be easily performed, thereby enabling to simplify a manufacturing step relevant to the positioning. Therefore, according to this embodiment, the sensor is more easily manufactured. In the ground pattern 80, the ground patterns 81 and 82 of the bent portions are narrower than the ground pattern 83 of the first portion 51, the ground pattern 84 of the second portion 52, and the ground pattern 85 of the connection portion 53. Thus, this configuration allows the bent portions 55a and 55b to be bent more easily than other portions, with respect to a condition such as the elasticity and the rigidity of the substrate 50. Consequently, the sensor can be manufactured more easily.

Further, providing the connection portion 53 makes it easier to provide the space between the first portion 51 and the second portion 52. This makes it easier to provide the detection region between the generator 41 and the detector 35.

The substrate 50 and the motion body are relatively moved such that the motion body enters the region between the generator 41 and the detector 35, thereby enabling to manufacture the sensor 31 capable of sensing the motion of the motion body with the generator 41 and the detector 35 provided on the substrate 50 in which the first portion 51 and the second portion 52 are integrated. The motion body enters the region (the detection region) from a side opposite to the connection portion 53, thereby making the ease of positioning and manufacturing and the merit of providing the connection portion 53 compatible.

The first portion 51 and the second portion 52 are provided parallel to each other, and thus, a position relationship between the generator 41 provided on the first portion 51, and the detector 35 provided on the second portion 52 can be adjusted on the basis of a relationship between the first portion 51 and the second portion 52 provided parallel to each other. This facilitates position adjustment for allowing the detector 35 to be arranged in a generation region of the detection target generated by the generator 41 when the generator 41 has directive properties, and the design relevant to the position angle when the generator 41 and the detector 35 are provided on the substrate 50. A relative movement direction between the substrate 50 and the motion body is along the first portion 51 and the second portion 52. This makes it easier to determine the reference of the relative movement direction and makes it difficult for the substrate 50 and the motion body to be in contact with each other when they are relatively moved. Consequently, the motion body can more easily enter the region (the detection region).

A cutout (for example, the cut-out portion 51a) for setting the shaft 12 and the substrate 50 to be in a non-contact state, in a state where the motion body enters the region between the generator 41 and the detector 35, is provided. Thus, the cutout inhibits contact between the substrate 50 and the shaft 12 and prevents the motion of the shaft 12 from being hindered.

The first member (for example, the chassis 22) and the second member (for example, the body 21) are brought closer to each other to assemble the housing, and the substrate 50 and the motion body are relatively moved such that the motion body enters the region between the generator 41 and the detector 35, thereby allowing the motion body to enter the region between the generator 41 and the detector 35 in one step of the assembly of the housing, simultaneously with the assembly. The adjustment of a position relationship between the motion body and radiation from the generator 41 to the detector 35 can also be set in accordance with the position relationship between the first member and the second member in the assembly of the housing. Therefore, according to the sensor 31 of this embodiment, the manufacturing is more easily performed.

The first member and the second member are assembled, and then, the entrance (for example, the opening portion 21a) of the second member through which the substrate enters is covered with the covering member (for example, the cover 23), thereby sealing the generator 41, the detector 35, and the motion body, in the housing. Therefore, according to this embodiment, the sensor 31 is capable of sensing the motion of the motion body with high accuracy.

The connection portion 53 is provided with the wiring connected to the generator 41, thereby enabling to integrate the wiring connected to the generator 41 with the connection portion 53. This makes the connection portion 53 and the substrate 50 including the wiring more compact.

The width of the connection portion 53 is less than those of the first portion 51 and the second portion 52. This configuration makes the area of the substrate 50 smaller, compared to a case where the width of the substrate 50 including the first portion 51 and the second portion 52 with connection portion 53 therebetween is uniform, thereby further reducing the weight of the substrate 50.

The substrate 50 is bent at two portions, thereby enabling to provide the detection region between the generator 41 and the detector 35 by bending the substrate 50. The bending portion is therefore clarified.

The first portion 51 is smaller than the second portion 52, thereby further reducing the weight of the first portion 51. This makes the requirements for the connection portion 53, such as strength, relax.

The substrate 50 is bent into a shape (for example, a U-shape) where the generator 41 and the detector 35 face each other, and thus, a part of the substrate 50 (for example, the second portion 52 or the like) can be along the plane in the stator 20 (for example, the plane portion of the chassis 22, or the like), and the handling in providing the sensor 31 in the housing is more easily performed.

The substrate 50 is a flexible substrate. This makes it easier to perform a series of operations in which the component including the generator 41 and the detector 35 is mounted on the substrate 50 in a state where the first portion 51 and the second portion 52 exist in the same plane, and then, the substrate 50 is processed such that the detection region is provided between the generator 41 and the detector 35.

The substrate 50 includes the harness portion 54 including the wiring connected to the generator 41 and the detector 35. Thus, the wiring connected to the configuration of the sensor 31 including the generator 41 and the detector 35 can be collectively provided in the substrate 50. That is, by providing the harness portion 54, it is not necessary to separately pull out the wiring from a component (the circuit or the like) requiring the wiring. For this reason, it is not necessary to separately handle the substrate 50 and the wiring, which makes it easier to handle the sensor 31.

The detector 35 detects changes in the detection target, which occurs due to changes in the physical amount of the detection region, and thus, a target causing changes in the physical amount can be set to be a sensing target of the sensor 31.

The detection target is the electromagnetic wave (for example, the light emitted from the generator 41), thereby enabling to detect changes in the detection region due to changes in the electromagnetic wave.

A change in the physical amount is caused by the rotation of the motion body (for example, the optical scale 11) existing in the detection region, and thus, a rotation motion of the motion body can be the sensing target of the sensor 31.

One (for example, the second portion 52) of the first portion 51 and the second portion 52 is fixed to the first member (for example, the chassis 22), and the surface of the other (for example, the first portion 51) on a side opposite to a side facing the detection region adheres to the second member (for example, the body 21). That is, in the assembly of the sensor 31, it is sufficient that the one is fixed to the first member, and the surface of the other on a side opposite to a side facing the detection region adheres to the second member, and thus, the assembly of the sensor 31 is more easily performed.

Only by providing the plate-like member (for example, the support substrate 65) having adhesiveness on both surfaces, the surface of the other on a side opposite to a side facing the detection region adheres to the second member, thereby enabling to assemble the sensor 31 more easily.

The plate-like member (for example, the support substrate 65) is attached to the surface of the other on a side opposite to a side facing the detection region before the housing (for example, the stator 20) is assembled, thereby allowing the surface of the other to adhere to the second member in a state where the plate-like member is integrated with the substrate 50, and therefore, the sensor is assembled more easily.

The four light receiving elements are arranged in different positions on a predetermined plane (for example, the front surface 52A), all of the distances (the distances W) from the four light receiving elements to one point (the arrangement center S0) on the predetermined plane are equal to each other, four line segments connecting one point and the centers of the light receiving regions of the four light receiving elements form right angles (01 to 04) to each other, and the normal line (for example, the straight line L2) of the predetermined plane passing through the one point passes the emitting point 41S of the light generated by the generator 41. This configuration makes the distances of the four light receiving elements from the light emitting element equal to each other, thereby reducing variations in the outputs in accordance with the sensing of light by the light receiving elements. Thus, according to this embodiment, the outputs of the light receiving elements are more stabilized.

The support member is attached to the surface (for example, the rear surfaces 51B and 52B) on the rear side of the FPC, the support member being a member for keeping the surface (for example, the front surfaces 51A and 52A) on the opposite side thereof flat. This configuration further reduces stress on a connection portion between the FPC and the electronic component provided on the FPC. Thus, a defect according to the connection portion between the FPC and the electronic component provided on the FPC is reduced. Consequently, reliability relevant to the normal motion of the sensor 31 is increased. Further, the stress on the connection portion is reduced, thereby reducing the degree of difficulty in mounting the electronic component on the FPC, which makes it easier to provide the electronic component on the surface opposite to the surface on which the support member is provided.

The package of the integrated circuit (for example, the IC circuit 60) provided on the surface on the rear side (for example, the rear surface 52B), can be utilized as the support member of the electronic component provided on the surface on the opposite side (for example, the front surface 52A). Further, the integrated circuit is also one of the circuits included in the sensor 31. Thus, circuits are provided on both surfaces of the FPC, and therefore the substrate area is utilized more efficiently, thereby facilitating more easily reducing the area of the FPC with respect to the necessary circuit scale. Consequently, the sensor 31 is downsized more easily due to high integration of the circuit.

As with the support substrate 65, the plate-like member having insulating properties, formed corresponding to the shape of the first portion 51, is provided, and thus, the entire surface (for example, the front surface 51A) on which the electronic component is provided is supported by the support member.

The surface (for example, the front surface 51A) of the first portion 51, on which the generator 41 is provided, and the surface (for example, the front surface 52A) of the second portion 52, on which the detector 35 is provided, are provided parallel to each other and face each other. Further, the first axis LA and the second axis LB are parallel to each other, and the distance W1 between the first point (for example, the emitting point 41S) and the first axis LA, and the distance W2 between the second point (for example, the arrangement center S0) and the second axis LB, are equal to each other. Furthermore, the first point and the second point exist on the same straight line (for example, the straight line L1) intersecting with (or three-dimensionally intersecting with) the first axis and the second axis at a right angle in the substrate 50 before being bent. With this configuration, the first point and the second point exist on the same straight line (for example, the straight line L2) orthogonal to the first portion 51 and the second portion 52 after the substrate 50 is bent. Consequently, the generator 41 and the detector 35 are provided facing each other with higher accuracy, thereby further stabilizing the output of the detector 35.

The surface of the substrate 50, on which the generator 41 and the detector 35 are provided (the front surface 50A), is subjected to a reflection treatment, thereby reducing the reflection of the light emitted from the generator 41, on the substrate. This reduces the output of the detector 35 in accordance with the detection of the reflected light, thereby further stabilizing the output of the detector 35.

The shaft 12 is subjected to the antireflection treatment, thereby reducing the reflection of the light emitted from the generator 41, on the shaft 12. This reduces the output of the detector 35 in accordance with the detection of the reflected light, thereby further stabilizing the output of the detector 35.

The sensor 31 functions as a rotary encoder, thereby detecting the angle position such as the turning angle of the turning motion body that is connected to the sensor 31.

Figure 29:
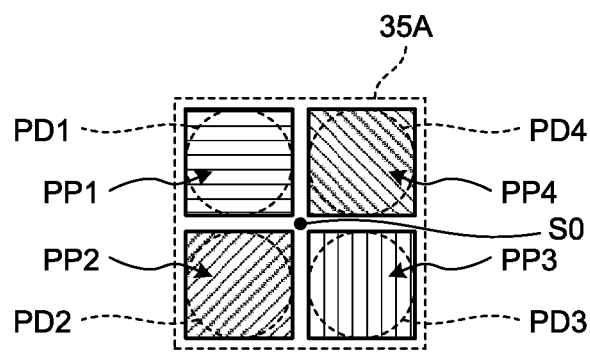
FIG. 29 is a diagram illustrating another arrangement example of a plurality of light receiving elements of the detector.

FIG. 29 is a diagram illustrating another arrangement example of the plurality of light receiving elements of the detector 35. As illustrated in FIG. 29, the detector 35 may be configured such that the first light receiver PD1 to the fourth light receiver PD4 respectively including the square polarization layers PP1 to PP4 are arranged at four corners of a square arrangement region 35A, centered around the arrangement center S0. Even in this case, the four light receiving elements can be arranged at the same distance from the arrangement center S0, and the four line segments connecting the arrangement center S0 and the centers of the light receiving regions of the four light receiving elements can be formed at right angles to each other. The distance between the arrangement center S0 and each of the four light receiving elements is arbitrarily set. However, each of the four light receiving elements can detect the light with the attenuation of the source light 71 from the generator 41 becoming less, as the distance is set shorter. The four light receiving elements may be separately provided on the second portion 52. Alternatively, the detector 35 as a package in which a position relationship between the four light receiving elements and the arrangement center S0 is fixed in advance may be provided on the second portion 52. By adopting such a package, the arrangement of the four light receiving elements is more easily adjusted.

The first portion 51 and the second portion 52 may be other than parallel to each other. The relationship between the first portion 51 and the second portion 52 may be any relationship in which the detection region can be provided between the generator 41 and the detector 35, and the detection target generated by the generator 41 provided in the first portion 51 can be detected by the detector 35 provided in the second portion 52. The detailed arrangement between the first portion 51 and the second portion 52 can be changed as appropriate.

The relationship between the first portion 51 and the second portion 52 may be reverse. That is, the first portion 51 may be fixed to the first member, and the other surface of the second portion 52 on a side opposite to a side facing the detection region (the rear surface 52B) may adhere to the second member. However, in this case, for example, the substrate 50 and the circuit provided on the substrate 50 (for example, the component 61 or the like) are configured in consideration of the interference of the housing (for example, the stator 20) with respect to the configuration, or the like, such as forming the shape of the second portion 52 to be the same as the shape of first portion 51 in this embodiment. Further, for example, a cut-out portion such as the cut-out portion 51a, which prevents the substrate 50 and the shaft 12 from being in contact with each other, is provided in accordance with a region in which the shaft 12 extends. For example, in a case where the shaft 12 extends to penetrate through the optical scale 11 and exists in a position across both of the first portion 51 and the second portion 52, the cut-out portion is provided in both of the first portion 51 and the second portion 52.

The connection portion 53 may not include the wiring. In this case, the connection portion 53, for example, supports one of the first portion 51 and the second portion 52, which is not fixed to the chassis 22. It is not essential that the one of the first portion 51 and the second portion 52 be smaller than the other. The first portion 51 and the second portion 52 may be the same size, or the one supported by the connection portion 53 may be larger than the other. The stator 20 or the like may include a support portion for supporting at least one of the connection portion 53 and the first portion 51 in this embodiment. A configuration (for example, an adhesive agent, a tape, or a locking portion such as a protrusion) for fixing at least one of the connection portion 53 and the first portion 51 in this embodiment to such a support portion may be provided.

The substrate is not limited to the flexible substrate. The substrate in the present invention may be any substrate in which the detection region can be provided between the generator 41 and the detector 35, the detection target generated by the generator 41 provided on the first portion 51 can be detected by the detector 35 provided on the second portion 52, and the first portion 51 and the second portion 52 are integrated. For example, a substrate made of a material that can be bent in a portion by heat treatment may be adopted, and the portion (for example, the connection portion or the like) between the first portion and the second portion may be subjected to such treatment and be bent such that the first portion and the second portion face each other. A substrate, such as a rigid flexible substrate, including both of a portion hard to be deformed and a portion easily deformed, may be adopted. In this case, the portion hard to be deformed is used for the first portion and the second portion, and the portion easily deformed is used for the portion (for example, the connection portion or the like) between the first portion and the second portion, thereby allowing the first portion and the second portion to face each other.

The harness portion 54 may be omitted as appropriate. There may be two or more extension portions functioning as the harness portion. An extending direction of the extension portion functioning as the harness portion is arbitrarily set, and there is no particular limitation according to the positional relationship with respect to the other portions of the substrate 50, such as the connection portion 53.

In the relative movement between the motion body and the substrate 50, either one of the motion body or the substrate 50 may be moved to be close to the other, or both of the motion body and the substrate 50 may be moved to be close to each other. Specifically, for example, in the assembly of the sensor 31, the first member (the chassis 22) and the second member (the body 21) may be brought close to each other in such a way that, with either one (for example, the body 21) fixed, the other (for example, the chassis 22) is moved, in such a way that the relationship between the fixing and the movement is reverse, or in such a way that both of the first member and the second member are moved.

A specific pattern of the signal track T1 of the optical scale 11 and the pattern of the polarization layers PP1 to PP4 provided in the detector 35, can be changed as appropriate. Such patterns are determined in consideration of a relationship between a pattern of a configuration (for example, the optical scale 11) that is provided in the detection region and causes polarization, and a pattern of a configuration (for example, the polarization layer) through which light passes at the time of performing detection.

The configuration provided in the detection region is not limited to the optical scale 11 causing the polarization. For example, a plate-like member provided with a hole or a transmission portion through which light selectively passes or is selectively transmitted depending on the turning angle of the rotor 10 may be provided instead of the optical scale 11. In this case, a change in the turning angle of the rotor 10 is represented as a change in a position or a timing at which light is detected by the detector. Such a detector may not include the polarization layers PP1 to PP4. A signal indicating the position where the light is detected is output from the sensor, and thus, the angle position of the rotary machine connected to the shaft 12 is detected. In this case, it is not necessary that the detector include four light receiving elements. For example, one light receiving element may be provided, or a plurality of light receiving elements may be provided. When there is one light receiving element, it is preferred that a distance between the second axis LB and the center of the detection region of the detection target to be detected by the one light receiving element (the center of the light receiving region) be regarded as the distance W2 described above, and then, the distance W2 be set to be equal to the distance W1. When there are a plurality of light receiving elements, it is preferred that a distance between the second axis LB and the arrangement center of the plurality of detection regions of the detector configured of the plurality of light receiving elements be regarded as the distance W2 described above, and then, the distance W2 be set to be equal to the distance W1.

The light emitting element of the generator 41, which emits light, is not limited to the light emitting diode. The light emitting element may be a point light source, or may be a surface light source. In a case where the light emitting element is the surface light source, the center of the generation region of the light in the surface light source can be set as a point corresponding to the emitting point 41S of the light in the embodiment described above, and a straight line that passes through the center of the emitting surface of light in the light emitting element and is along a direction in which the light emitting element and the light receiving element face each other can be defined. The straight line defined as described above can be regarded as the same straight line as the straight line L2 illustrated in FIG. 13, and the arrangement of each of the four light receiving elements can be determined in the same manner as that in the embodiment described above. That is, the four light receiving elements can be arranged at different positions on a predetermined plane orthogonal to the straight line and at the same distance from the straight line, and the arrangement of the four light receiving elements can be determined such that the four line segments, which connect the respective centers of the light receiving regions of the four light receiving elements and an intersection point between the straight line and a predetermined plane, form at right angles to each other. The center of the emitting surface 41T may be used instead of the emitting point 41S of the light.

In the embodiment described above, the component (the IC circuit 60 and the support substrate 65) functioning as the support member for keeping the surface (the front surfaces 51A and 52A) on which the electronic component is provided flat, is attached to each of the first portion 51 and the second portion 52, but it is not necessary that the component be provided on each of the first portion 51 and the second portion 52. Such a configuration can be changed as appropriate in accordance with the arrangement of the component provided on the FPC that is used as the substrate 50 of the embodiment of the present invention, and the component may be provided on only one of the first portion 51 and the second portion 52. The support member may be provided on the connection portion 53 or the like.

The electromagnetic wave as the detection target is not limited to the light or laser light from the light emitting diode. The electromagnetic wave as the detection target may be invisible light such as an infrared ray or an ultraviolet ray, an X ray, or the like. The detection target may be a magnetic force. In this case, the generator generates a magnetizing field and a magnetic field by the magnetic force. The detector detects changes related to the magnetic force, which occur due to changes in the physical amount in the detection region (for example, passage of an object), to perform the sensing. In a case where the detection target is the magnetic force, a change in the detection region can be detected according to a change in the magnetic force. Other than the electromagnetic wave and the magnetic force, the detection target may be, for example, an acoustic wave such as an ultrasonic wave, an ion such as plasma, or a cathode ray (an electron ray). The detection target may be anything that is changed due to a change in the physical amount of the configuration provided in the detection region.

The change in the physical amount may be a change due to a linear motion of a linear motion body existing in the detection region. In this case, the linear motion of the linear motion body can be the sensing target of the sensor. The sensor is capable of functioning as a linear encoder. Specifically, a change in the detection target, which occurs due to a configuration (for example, the scale or the like) being linearly moved relatively with respect to the first portion 51 and the second portion 52 in the detection region, is detected by the detector, and thus, the sensor functioning as the linear encoder senses the linear motion of the configuration. Thus, the presence or absence of the motion of the linear motion body connected to a detection encoder, and a motion position thereof can be detected according to the embodiment of the present invention. Furthermore, in a case where the motion body is a rotating body (the optical scale 11 attached to the end portion of the shaft 12) in the same manner as the embodiment described above, a portion in the vicinity of the shaft 12 does not enter the region (the detection region), and thus, a portion entering the region is a part of the motion body. On the other hand, in a case where the motion body is the linear motion body, it is obvious that at least a part of the motion body enters the region. In addition, the entire motion body may enter the region (for example, it may pass through the inside and the outside of the region), according to the region of the movement that can be performed by the linear motion body. Thus, the motion body may be any member of which at least a part is moved in the region between the generator and the detector.

The invention claimed is:

1. A sensor comprising:
   a generator configured to generate a predetermined detection target;
   a detector configured to detect the detection target generated by the generator;
   a substrate provided with the generator and the detector, the substrate including a first portion, a second portion, a bent portion, and a ground pattern;
   an optical scale that rotates in a detection region between the generator and the detector;
   a stator that has a cylindrical body and that houses the substrate and the optical scale,
   wherein the ground pattern is provided in a portion including:
     the first portion provided with the generator;
     the second portion provided with the detector; and
     the bent portion that is bent between the first portion and the second portion,
   wherein, in the ground pattern, a ground pattern of the bent portion is narrower than:
     a ground pattern of the first portion provided with the generator, and
     a ground pattern of the second portion provided with the detector that faces the generator in a direction perpendicular to the first portion,
   wherein the stator comprises:
     a first member fixing one of the first portion and the second portion;
     a second member movably supporting the optical scale; and
     a cover to close an opening of the second member,
   wherein the first member has two support members opposing each other to insert the one of the first portion and the second portion, wherein each of the two support members have:
an arc-shaped inner circumference that is in contact with an outer circumference of the one of the first portion and the second portion; and
an arc-shaped outer circumference that is along an inner circumference of the second member body, and
wherein the opening is provided to insert, along a direction perpendicular to a rotation axis of the optical scale; the two support members; and
the substrate of which one of the first portion and the second portion is fixed to the first member.

2. The sensor according to claim 1,
wherein the substrate includes a connection portion connecting the first portion and the second portion together, and
wherein the bent portion is provided between the connection portion and the first portion, and between the connection portion and the second portion.

3. The sensor according to claim 2,
wherein the ground pattern is further provided in a portion including the connection portion, and
wherein, in the ground pattern, the ground pattern of the bent portion is narrower than a ground pattern of the connection portion.

4. The sensor according to claim 1,
wherein the substrate is a flexible printed circuit.

5. The sensor according to claim 1,
wherein the sensor is a rotary encoder.

6. A sensor manufacturing method, which is a manufacturing method of a sensor including
a generator configured to generate a predetermined detection target, a detector configured to detect the detection target generated by the generator,
a substrate provided with the generator and the detector,
an optical scale that rotates in a detection region between the generator and the detector, and
a stator that has a cylindrical body and that houses the substrate and the optical scale, the method comprising:

a step of preparing the substrate including a first portion, a second portion, a bent portion, and a ground pattern,
a step of preparing the ground pattern provided in a portion including:
the first portion provided with the generator;
the second portion provided with the detector; and
the bent portion provided between the first portion and the second portion;
a step of bending the substrate in the bent portion;
a step preparing the stator comprising:
a first member fixing one of the first portion and the second portion;
a second member movably supporting the optical scale; and
a cover to close an opening of the second member, the first member having two support members opposing each other to insert the one of the first portion and the second portion, and each of the two support members having:
an arc-shaped inner circumference that is in contact with an outer circumference of the one of the first portion and the second portion; and
an arc-shaped outer circumference that is along an inner circumference of the second member body; and
a step of inserting the two support members and the substrate of which one of the first portion and the second portion is fixed to the first member, to the opening, along a direction perpendicular to a rotation axis of the optical scale,
wherein, in the ground pattern, a ground pattern of the bent portion is narrower than:
a ground pattern of the first portion provided with the generator; and
a ground pattern of the second portion provided with the detector that faces the generator in a direction perpendicular to the first portion.

* * * * *